(12) United States Patent
Stefanovski et al.

(10) Patent No.: US 12,434,663 B2
(45) Date of Patent: Oct. 7, 2025

(54) VEHICLE DIGITAL KEY MANAGEMENT ON A BLOCKCHAIN

(71) Applicant: Ford Global Technologies, LLC, Dearborn, MI (US)

(72) Inventors: Vladimir Stefanovski, Windsor (CA); Karl Nathan Clark, Belleville, MI (US); Riaz Ulla, Lasalle (CA); Zoheb Mohammed, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 18/073,456

(22) Filed: Dec. 1, 2022

(65) Prior Publication Data

US 2024/0181987 A1    Jun. 6, 2024

(51) Int. Cl.
| | |
|---|---|
| *B60R 25/24* | (2013.01) |
| *G07C 9/00* | (2020.01) |
| *H04L 9/00* | (2022.01) |
| *H04L 9/08* | (2006.01) |

(52) U.S. Cl.
CPC .......... *B60R 25/24* (2013.01); *G07C 9/00309* (2013.01); *H04L 9/0816* (2013.01); *H04L 9/50* (2022.05); *G07C 2009/00507* (2013.01); *H04L 2209/84* (2013.01)

(58) Field of Classification Search
CPC ............... B60R 25/24; G07C 9/00309; G07C 2009/00507; H04L 9/0816; H04L 9/50; H04L 2209/84; H04L 9/3239
See application file for complete search history.

(56) References Cited

U.S. PATENT DOCUMENTS

| | | |
|---|---|---|
| 9,139,091 B1 | 9/2015 | Penilla et al. |
| 9,189,900 B1 | 11/2015 | Penilla et al. |
| 9,849,364 B2 | 12/2017 | Tran et al. |
| 9,892,584 B1 | 2/2018 | Saylor |
| 10,275,956 B1 | 4/2019 | Gehret et al. |
| 10,713,727 B1* | 7/2020 | Floyd .................. G05D 1/0214 |
| 10,997,251 B2 | 5/2021 | Tran et al. |
| 11,305,666 B2 | 4/2022 | Penilla et al. |
| 12,003,622 B1* | 6/2024 | Anderson ............... H04L 9/085 |
| 2020/0134592 A1 | 4/2020 | Rao et al. |

(Continued)

*Primary Examiner* — Rufus C Point
(74) *Attorney, Agent, or Firm* — Christopher Storms; McCoy Russell LLP

(57) ABSTRACT

Methods and systems are provided for storing vehicle, vehicle owner, and vehicle operator data on a blockchain, the data including smart contracts that may be executed to control a usage of the vehicle via customizable permissions. In an embodiment, a vehicle management system comprises a blockchain; a streaming service configured to provide event data in real time to a contract executing virtual machine (VM) embedded in the blockchain; and a non-transitory memory storing instructions that when executed by a processor of the vehicle management system, cause the vehicle management system to generate a digital key for an operator of a vehicle of the vehicle management system, the digital key controlling access to the vehicle and/or a use of one or more functionalities of the vehicle by the operator, based on one or more smart contracts; and store data of the vehicle, the owner, and the operator on the blockchain.

18 Claims, 7 Drawing Sheets

(56) References Cited

U.S. PATENT DOCUMENTS

| | | | |
|---|---|---|---|
| 2020/0413408 A1* | 12/2020 | Bailey | H04W 12/106 |
| 2021/0042841 A1 | 2/2021 | Floyd et al. | |
| 2021/0248214 A1* | 8/2021 | Goldston | G06F 21/16 |
| 2021/0390531 A1* | 12/2021 | Voorhees | G06Q 20/367 |
| 2022/0123923 A1* | 4/2022 | Patne | H04W 12/04 |
| 2023/0162544 A1* | 5/2023 | Hua | H04W 12/069 |
| | | | 340/5.72 |
| 2024/0070306 A1* | 2/2024 | Jurat | G06F 21/32 |

* cited by examiner

VEHICLE DIGITAL KEY MANAGEMENT ON A BLOCKCHAIN

FIELD

The present description relates to methods and systems for automatically enabling different functionalities for different users of a vehicle, via digital keys, based on smart contracts stored in a distributed ledger.

BACKGROUND/SUMMARY

In various scenarios, a vehicle owner may wish to deploy one or more revocable digital keys to a specified person or persons based upon a pre-defined set of rules. For example, rental car companies and fleet operators may wish to grant temporary and/or revocable digital keys to certain individuals authorized to access and operate their vehicles. Terms under which authorization is provided may depend upon one or more factors stipulated by the vehicle owner. Examples include authentication of an operator's identity, duration of usage, valid driver's license, etc. Additionally, the owner may wish to enable or disable various functionalities of the vehicle under certain circumstances. For example, a company may wish to limit a number of continuous hours that drivers may operate a company delivery van. Additionally or alternatively, the owner may wish to enable or disable various functionalities of the vehicle for different operators. For example, the vehicle may include a crane, where a first driver may be authorized to operate the vehicle and operate the crane, while a second driver may be authorized to operate the vehicle and not authorized to operate the crane.

Various implementations of revocable digital keys exist for various physical assets including vehicles. For example, U.S. Pat. No. 9,892,584B1 discloses techniques for enabling owners to distribute electronic keys to other users, where the owners can limit a number of times the key may be used, establish a window of time for use, or require a borrower to have certain qualifications. U.S. Ser. No. 10/275,956B1 discloses methods for receiving requests to generate and share electronic keys permitting access to a resource, where constraints can be placed such as time, location, and/or presence of a user, and the key can be automatically denied/revoked if conditions are not met. U.S. Pat. No. 9,189,900B1 teaches granting e-keys to recipients with a user account for use of a vehicle, where an owner can create a user account and set permissions for duration, time, and/or access to operating functions of vehicle or user interfaces of vehicle.

However, the inventors herein have identified problems with current implementations of digital key management systems. Typically, a key management server determines whether conditions are satisfied each time a use is attempted. However, the key management server may not support changing permissions flexibly while the vehicle is being used, based on conditions that may occur during use. The key management server may become non-functional, for example, during a power outage, or a connection between a computing device including the key (e.g., a smart phone) and the key management server may be lost, which may result in non-enforcement of permissions and/or vehicles becoming unusable. Additionally, an amount of memory resources, processing power, and/or communication bandwidth that the key management server relies on may be large, which may cause a lack of responsiveness and delays with respect to using the vehicles, or other technical problems, and may increase a cost of operating the key management server. Further, key management server may control access to a vehicle, but may not control usage of different functionalities of the vehicle, or a range of functionalities over which the key management server has control may be limited. Adding new functionalities over which the key management server has control may be slow and time consuming, and may further drain resources of the key management server.

In one embodiment, the problems described above may be addressed by a vehicle management system, comprising a blockchain; a streaming service configured to provide event data in real time to a contract executing virtual machine (VM) embedded in the blockchain; and a non-transitory memory storing instructions that when executed by a processor of the vehicle management system, cause the vehicle management system to generate a digital key for a user of a vehicle of the vehicle management system, based on input from an owner of the vehicle, the digital key controlling access to the vehicle and/or a use of one or more functionalities of the vehicle by the user, based on one or more smart contracts; store data of the vehicle, the owner, and the user on the blockchain, the data including the one or more smart contracts; and transmit the digital key wirelessly to a device (e.g., a computing device) of the user. The digital key may include a computer application for implementing a version of the streaming service, which may be launched on the device of the user or in an electronic control unit (ECU) of the vehicle. In some embodiments, the digital key may also include a copy of the blockchain, which may be installed either on the device or at the ECU. When the streaming service is implemented, the contract executing VM embedded in the blockchain (e.g., in a master copy at the vehicle management system, a local copy installed on the device, or a local copy installed in the vehicle) may receive the event data from the streaming service installed at the vehicle. If the contract executing VM determines that the one or more conditions of the one or more smart contracts have been met, instructions controlling the access to the vehicle and/or the use of the one or more functionalities of the vehicle may be transmitted from the contract executing VM to the vehicle ECU to be executed. For example, the instructions may include computer code that when executed enables or disables the access or functionalities, or the instructions may be converted to computer code at the vehicle ECU. In this way, access to the vehicle and/or the use of various functionalities of the vehicle may be selectively enabled or disabled based on the event data. By controlling the access and/or use of the various functionalities via the smart contracts, which may be created and customized by owners via a user-friendly graphical user interface (GUI) of the vehicle management system, an owner of the vehicle may create customized conditions for use the vehicle by different operators in an easier, more flexible, and more customizable manner than provided by current digital key implementations. Additionally, by storing the smart contracts in a distributed fashion across a plurality of copies of the blockchain, a validity of the smart contracts may be verified at any time by consulting the various copies via standard blockchain operations known in the art, thereby increasing a security of the vehicle and decreasing a possibility of an unauthorized access or use of the vehicle. Further, in embodiments where a copy of the blockchain is installed at the vehicle, execution of the smart contracts and control of the vehicle may be carried out at the vehicle (e.g., between the digital key and the vehicle), without involving the vehicle management system. As a result, control over the vehicle may not rely on an availability of the vehicle management system or a quality of a wireless connection between the vehicle and the vehicle management system, resulting in a more robust and independent control of the vehicle in accordance with the smart contracts.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
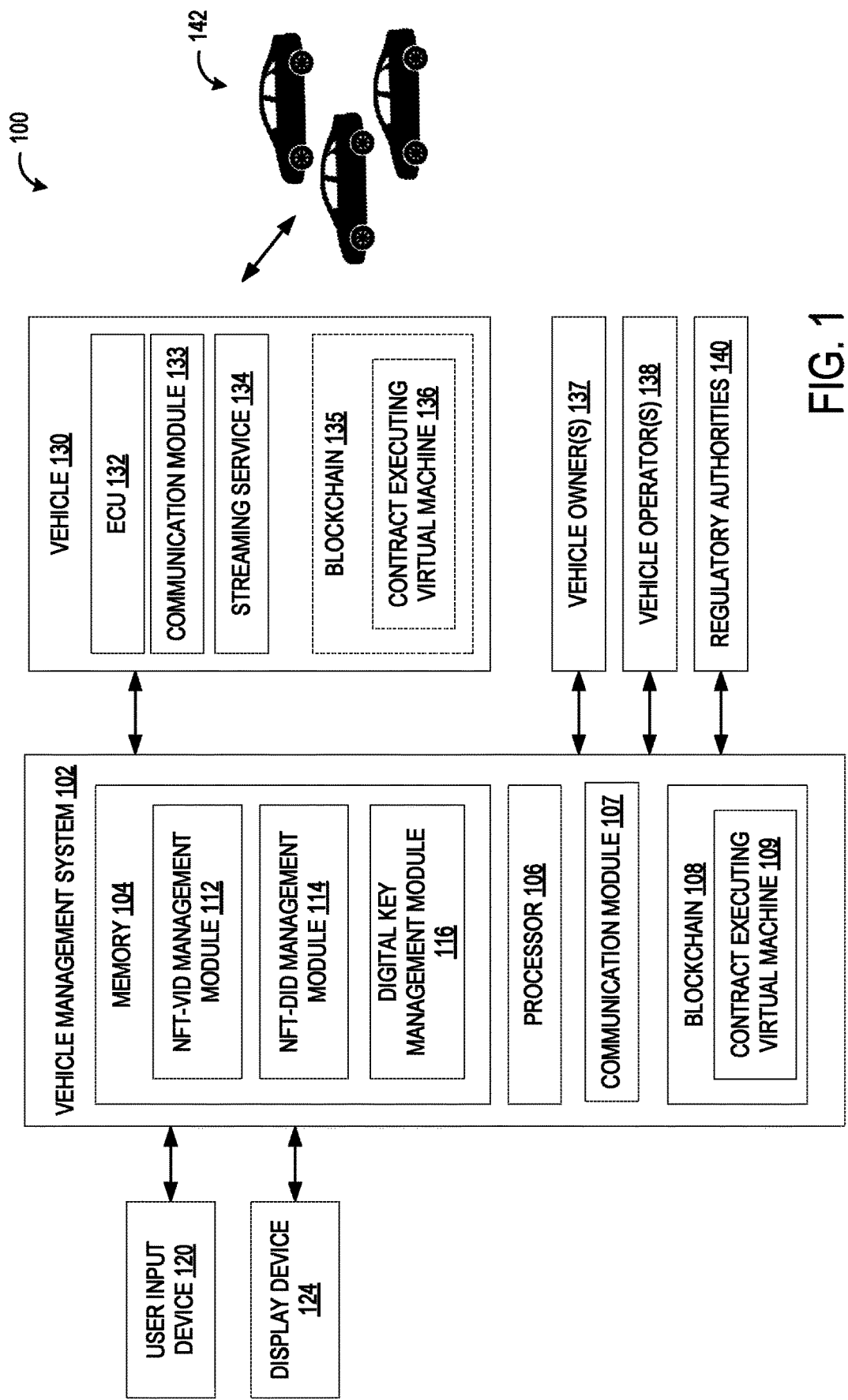
FIG. 1 is a schematic block diagram of an exemplary vehicle management system, according to an embodiment.

The following description relates to systems and methods for controlling access to and operation of a vehicle using customized digital keys, based on storing vehicle, vehicle operator, and vehicle owner data in a distributed ledger system such as on a blockchain. In various embodiments, the vehicle, vehicle operator, and vehicle owner data may be stored in non-fungible tokens (NFTs) on the blockchain.

A distributed ledger is a transactional record that is maintained at each node of a decentralized, peer to peer (P2P) network. Commonly, the distributed ledger is comprised of groupings of blockchain transactions bundled together into a "block." When a change to the distributed ledger is made (e.g., when a new blockchain transaction and/or block is created), each node must form a consensus as to how the change is integrated into the distributed ledger. Upon consensus, the agreed-upon change is pushed out to each node so that each node maintains an identical copy of the updated distributed ledger. Any change that does not achieve a consensus is ignored. Accordingly, unlike a traditional, centralized ledger, a single party cannot unilaterally alter the distributed ledger.

In one application of distributed ledgers, each new block may be cryptographically linked to the previous block in order to form a chain (e.g., a blockchain). More particularly, to create a new block, each blockchain transaction within a block may be assigned a hash value (e.g., an output of a cryptographic hash function, such as SHA-2 or MD5). These hash values may then be combined together utilizing cryptographic techniques (e.g., a Merkle Tree) to generate a hash value representative of the entire new block. This hash value may then be combined with the hash value of the previous block to form a hash value included in the header of the new block, thereby cryptographically linking the new block to the blockchain. To this end, the precise value utilized in the header of the new block is dependent on the hash value for each blockchain transaction in the new block, as well as the hash value for each blockchain transaction in every prior block.

In some embodiments, the hash value generated for the new block may be used as an input to a cryptographic puzzle that manipulates a nonce value. When a solution to the cryptographic puzzle is found, the solving node publishes the solution and the other nodes then verify that the solution is the correct solution. Because the solution may also depend on the particular hash values for each blockchain transaction within the blockchain, if the solving node attempted to modify any blockchain transaction, the solution would not be verified by the other nodes. More particularly, if a single node attempts to modify a prior blockchain transaction within the blockchain, a cascade of different hash values are generated for each tier of the cryptographic combination technique. This results in the header for one or more blocks being different than the corresponding header(s) in every other node that did not make the exact same modification. As a result, the solution generated by the modifying node would not solve the cryptographic puzzle presented to any node without the identical modification. Thus, the version of the new block generated by the modifying node is readily recognized as including an improper modification and is rejected by the consensus. This inability to modify past blockchain transactions lead to blockchains being generally described as trusted, secure, and/or immutable.

For a vehicle management system based on a distributed ledger, data of vehicles, owners of vehicles, and operators of vehicles, including digital key data establishing permissions to access and operate the vehicles, may be written to blocks of the blockchain as described above. In this way, the digital key data may be stored in an immutable manner.

A smart contract is a computer protocol that enables the automatic execution and/or enforcement of an agreement or transaction between different parties. In particular, the smart contract may be computer code that is located at a particular address on the blockchain. The smart contract may include one or more trigger conditions, that, when satisfied, correspond to one or more actions. For some smart contracts, which action(s) of the one or more actions are performed is determined based upon one or more decision conditions. The contract executing VM executing the smart contract may subscribe to one or more data streams including data related to a trigger condition and/or a decision condition. Accordingly, the contract executing VM may route the data streams to the smart contract so that the smart contract may detect that a trigger condition has occurred and/or analyze a decision condition to direct the enforcement entity to perform one or more actions.

By recording a smart contract in the distributed ledger, there is a public and trusted record of the smart contract and the reasoning behind actions performed as directed by the smart contract. As a result, parties that generate a smart contract may rely on an automatic enforcement of their contracts in a transparent and objective manner. The distributed ledger may either be a public ledger (each node may readily view the underlying data of each blockchain transaction) or a private ledger (the underlying data needs an encryption key to be viewed), or a combination of public and private ledger.

Additionally, systems and methods are disclosed herein for generating customized, revocable digital keys for different owners and/or operators of a vehicle of the vehicle management system, where the digital keys may allow different levels of access to the vehicle and/or terms of usage for various functionalities of the vehicle for each operator/owner. The digital keys may be created and/or updated on the vehicle management system (e.g., for example, via a web application of the vehicle management system in an Internet browser), or the digital keys may be created and/or updated via a computer application (also referred to herein as an application) of the vehicle management system running on an electronic device of an owner of the vehicle. As described herein, the different levels of access to the vehicle and/or terms of usage for various functionalities of the vehicle may be defined in one or more smart contracts stored in one or more NFTs on the blockchain. The smart contracts may be executed by a contract executing VM embedded in a copy of the blockchain, where the copy of the blockchain may be included in the digital key and transferred and installed at the vehicle, or the copy of the blockchain may be a master copy of the blockchain stored at the vehicle management system. By managing terms of usage using smart contracts that are independently created and stored on a blockchain, a greater flexibility in creating different terms of usage for different vehicles and individuals may be achieved. Further, the immutability of the blockchain provides a permanent record of the history of digital keys.

The smart contracts may be automatically executed based on real-time event data received at the contract executing VM embedded in the blockchain. The real-time event data may be transmitted from a streaming service running at the vehicle, and may include, for example, identifying information of the operator using the digital key; expiration data of the digital key; a time of access of the vehicle by the operator; a time of usage of a functionality of the vehicle by the operator; and/or other data. The digital keys may reference the NFTs to obtain vehicle, owner, and/or operator data to input into the smart contracts, or the smart contracts may reference the NFTs to obtain vehicle, owner, and/or operator data used for contract execution.

Executing the smart contracts at the vehicle rather than the vehicle management system may be advantageous for various reasons. Contracts may be executed more quickly at the vehicle, where communication between the vehicle and the vehicle management system may not be relied on. For example, the communication may be delayed or unavailable due to network or technical issues. A use of processing and memory resources by the vehicle management system may be reduced, increasing a general efficiency of the vehicle management system.

Figure 2B:
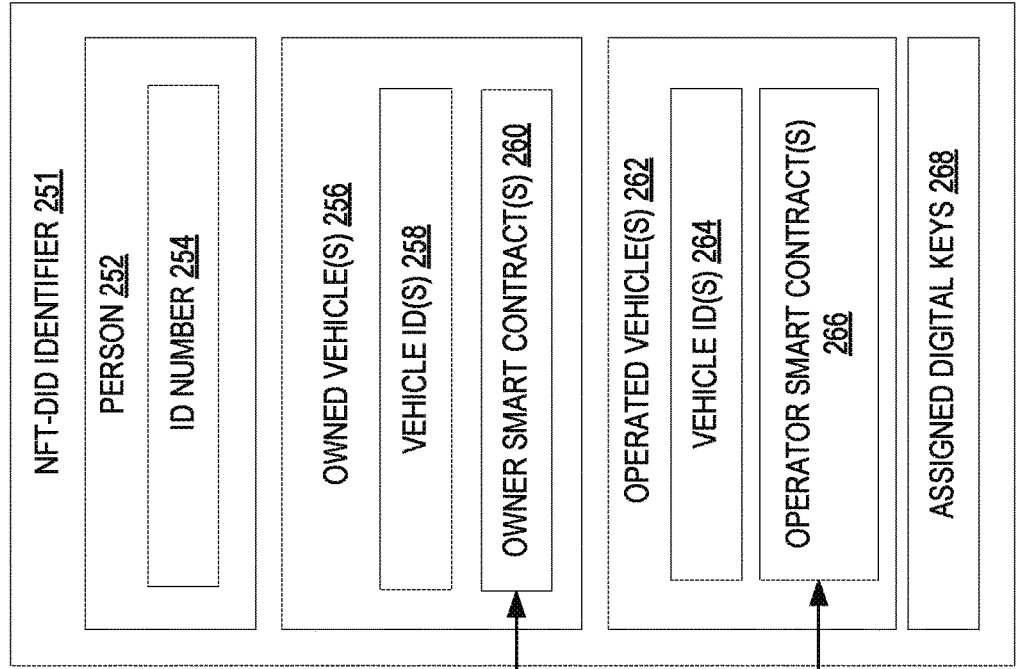
FIG. 2B is a schematic block diagram of a second NFT including data of a person included in a vehicle management system, according to an embodiment.
Figure 2A:
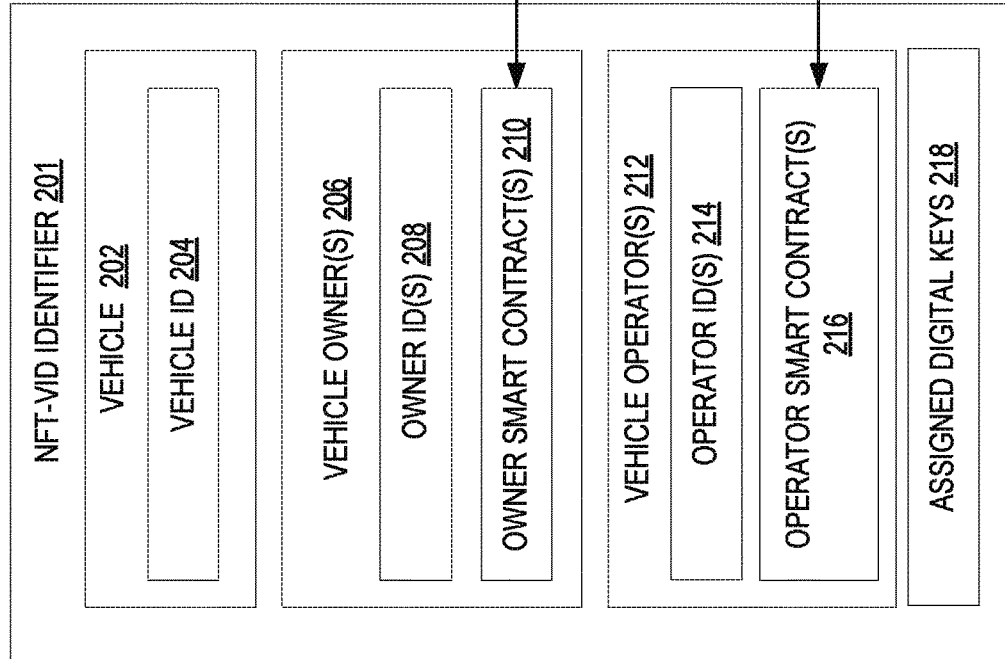
FIG. 2A is a schematic block diagram of a first non-fungible token (NFT) including data of a vehicle included in a vehicle management system, according to an embodiment.

FIG. 1 shows a vehicle ecosystem including a vehicle management system. The vehicle management system includes a blockchain, on which various NFTs may be stored. The NFTs may include a NFT-VID of one or more vehicles, as shown in FIG. 2A, and NFT-DIDs of various users of the vehicle management system, which may be participants in the distributed ledger, as shown in FIG. 2B. The vehicle management system may generate digital keys, which may be stored in electronic devices of the users such as the electronic device shown in FIG. 3, and used to access and/or operate a vehicle of the one or more vehicles. New NFTs of vehicles may be created by the vehicle management system by following a method shown in FIG. 4. The digital keys may be generated by following a method shown in FIG. 5. When a digital key is used to access or operate a vehicle, a user of the digital key may be authenticated via a method shown in FIG. 6. Based on the permissions associated with the digital key, an ECU of the vehicle may control access and operation of the vehicle by following a method shown in FIG. 7.

FIG. 1 shows a vehicle ecosystem 100, including a vehicle management system 102. Vehicle management system 102 may be used to control access and/or use of a vehicle 130, where vehicle 130 may be a member of a vehicle fleet 142. In some embodiments, vehicle fleet 142 may include vehicles that are the same or similar. For example, vehicle 130 may be a rental car, and vehicle fleet 142 may be a fleet of rental cars owned by a vehicle rental company; or vehicle 130 may be a delivery vehicle and vehicle fleet 142 may be a fleet of vehicles of various sizes used to deliver products sold by a company. In other embodiments, vehicle fleet 142 may include a plurality of vehicles of various types. For example, a road construction company may manage a fleet of vehicles including trucks, excavators, cranes, backhoes, manager vehicles, etc. Each vehicle 130 may be operated (e.g., driven) by a same driver, or by different drivers. In some embodiments, the different drivers may each have a different assigned vehicle (e.g., as with taxi-cabs). In other embodiments, one or more drivers may drive and/or share one or more vehicles of vehicle fleet 142. For example, a road construction company may employ a first driver to operate a first vehicle owned by the company; a second driver to operate either of the first vehicle and a second vehicle; a third driver to operate a third vehicle but not the first vehicle or the second vehicle; a fourth driver to operate the second vehicle and a fourth vehicle; and so on. In other words, various operators may have permission to access and use certain vehicles 130 of fleet 142, and not have permission to access and use other vehicles 130 of fleet 142. The company may grant the permission to access and use the vehicles 130 to the various operators based on various criteria, such as training, level of responsibility, seniority, degree of trust, skill level, or others. As described in greater detail below, the permission may be granted to the various operators via digital keys, which may be customized with respect to operators, types of access, and/or functionalities of each vehicle 130.

Vehicle 130 may be a car, a bus, a truck, or a different type of machinery or vehicle operated by an operator. Vehicle 130 may be powered by an internal combustion engine, or vehicle 130 may be an electric vehicle powered by an electrical power source, or vehicle 130 may be a hybrid vehicle powered by both an internal combustion engine and an electrical power source. Vehicle 130 may also be a specialized vehicle used in a specific environment, such as, for example, a golf cart or transportation vehicle used in certain areas of a private facility such as an indoor facility. Vehicle 130 may be operated on public and/or private roads and highways, or on a set of tracks or rails (e.g., a train). In general, vehicle 130 may be any type of vehicle operated by an operator.

Access to vehicle 130 may be controlled via a remote keyless entry (RKE) system that uses radio frequency (RF) signals (e.g., of a fixed frequency) for the transmission and reception of vehicle control functionalities between an operator and vehicle 130. An RKE system may rely on the operator selecting a control element (e.g., a physical or virtual button) on an operator device such as a key fob or smart phone to gain access to vehicle 130, or the RKE system be a passive keyless entry (PKE) system, in which entry to vehicle 130 is controlled automatically when the operator device enters a threshold proximity of vehicle 130. An RKE system may additionally provide added functionalities such as starting engines, turning on and off antitheft alarms, initiating in-cabin thermal control, or operating certain features provided in vehicle 130. For example, vehicle 130 may include a hydraulic bed that lifts and lowers, or features used for plowing, towing, grading, harvesting, and so on, the use of which may be controlled by an RKE or PKE system. Further, the RKE/PKE system may not use a specific electronic device (e.g., a key fob), and may rely on a digital key that may be stored on various devices, such as a smart phone.

Vehicle 130 may include an electronic control unit (ECU) 132, such as a digital cockpit ECU, which may control operations of the keyless entry system. ECU 132 may include a processor, which may execute instructions stored in a memory of ECU 132 to implement portions of the keyless entry system. In some embodiments, ECU 132 may be powered by a power storage device of vehicle 130, such as a battery. The battery may be a dedicated ECU battery, or the battery may be a specified battery, for example, for an input-output controller of ECU 132, whereby power to execute the instructions may be available if power is not available via other power sources of vehicle 130. In various embodiments, the battery may supply the keyless entry system with sufficient power to operate when a motor or engine of vehicle 130 is not operating, and a main battery of vehicle 130 is not charged.

Vehicle 130 may include a communication module 133, which may support wireless communication between vehicle 130 and an electronic device including a digital key and/or vehicle management system 102. The wireless communication may rely on one or more of various wireless technologies (e.g., radio frequency, infrared, near field communication (NFC), etc.). For example, a wireless connection may be established via an RF link that supports bidirectional communication, whereby RF signals may be transmitted from the electronic device including the digital key to vehicle 130 and/or RF signals may be transmitted from vehicle 130 to the electronic device. Communication module 133 may communicate via a wireless local area network (LAN) or wide area network (WAN) using any past, present, or future communication protocol (e.g., BLUETOOTH™, USB 2.0, USB 3.0, etc.).

Vehicle management system 102 includes one or more processors 106 configured to execute machine readable instructions stored in non-transitory memory 104. Memory 104 may include one or more data storage structures, such as optical memory devices, magnetic memory devices, or solid-state memory devices, for storing programs and routines executed by processor(s) 106 to carry out various functionalities disclosed herein. Memory 104 may include any desired type of volatile and/or non-volatile memory such as, for example, static random access memory (SRAM), dynamic random access memory (DRAM), flash memory, read-only memory (ROM), etc.

Processor(s) 106 may be any suitable processor, processing unit, or microprocessor, for example. Processor(s) 106 may be a multi-processor system, and, thus, may include one or more additional processors that are identical or similar to each other and that are communicatively coupled via an interconnection bus. Processor(s) 106 may be single core or multi-core, and the programs executed thereon may be configured for parallel or distributed processing. In some embodiments, processor(s) 106 may optionally include individual components that are distributed throughout two or more devices, which may be remotely located and/or configured for coordinated processing. In some embodiments, one or more aspects of processor(s) 106 may be virtualized and executed by remotely-accessible networked computing devices configured in a cloud computing configuration.

Vehicle management system 102 may include a communication module 107, which may manage wireless communication between vehicle management system 102 and similar communication modules of vehicle 130 (e.g., communication module 133) and/or an operator device including a digital key.

Vehicle management system 102 may include a blockchain 108, which may be used by vehicle management system 102 as a distributed ledger to store permissions for accessing, operating, and/or using various functionalities of vehicle 130. In various embodiments, blockchain 108 may store one or more non-fungible tokens (NFTs) including permissions and other data of vehicle 130, referred to herein as NFT-VIDs. Blockchain 108 may also store one or more NFTs including permissions and other data of various persons linked to or associated with vehicle 130, referred to herein as NFT-DIDs. The various persons linked to or associated with vehicle 130 may include one or more vehicle owners 137 of vehicle 130, and one or more vehicle operators 138 of vehicle 130. The NFT-VIDs and the NFT-DIDs may be written to blockchain 108 and updated as new blocks are added to blockchain 108. Blockchain 108 may also store (e.g., in the NFT-VIDs and the NFT-DIDs) data sent to, used by, or received from various regulatory authorities 140.

Referring briefly to FIG. 2A, an exemplary NFT-VID 200 is shown. NFT-VID 200 may include an NFT-VID identifier 201, which may be used to reference NFT-VID 200. NFT-VID 200 may include various modifiable and/or immutable data fields. The immutable data fields may include a vehicle field 202, which may include identifying information of a vehicle (e.g., a vehicle 130) to which NFT-VID 200 corresponds. In various embodiments, a single NFT-VID 200 may correspond to a single vehicle in a 1:1 relationship, where no other NFT-VIDs correspond to the vehicle and no other vehicles correspond to NFT-VID 200. Vehicle field 202 may include, for example, an immutable vehicle ID 204, such as a Vehicle Identification Number (VIN). Vehicle field 202 may also include other identifying information of the vehicle (e.g., make, model, color, year, etc.). The identifying information may include text data, and/or other types of data such as image data (e.g., one or more images of the vehicle, images of identifying data of the vehicle, etc.). In other embodiments, vehicle field 202 may include other modifiable and/or immutable data fields. For example, the modifiable fields may include a title status field, registration status field, insurance information field, financing data field, etc.

Other modifiable data fields of NFT-VID 200 may include a vehicle owner(s) field 206, which may store identifying information of one or more owners of the vehicle. The identifying information may include one or more owner IDs 208 (e.g., an owner ID 208 for each vehicle owner). For example, in some embodiments, an owner ID 208 may be a driver's license of a respective vehicle owner 206, or a different type of identification. In other embodiments, the owner ID 208 may reference an NFT-DID of an owner of vehicle 202, for example, via an identifier of the NFT-DID, rather referencing the owner directly. The referenced NFT-DID may include owner identifying information, as described below in reference to FIG. 2B.

Additionally, vehicle owner(s) field 206 may include one or more smart contracts 210 that may be automatically executed when certain conditions of vehicle 202 are met with respect to a relevant owner 206. The one or more smart contracts may be stored as computer code to be executed on a contract executing virtual machine (VM) embedded in a blockchain such as blockchain 108 of FIG. 1, in response to the certain conditions being met, based on real-time event data made available to the contract executing VM. In various embodiments, the real-time event data may be streamed to the contract executing VM from a streaming service, for example, running at vehicle 202. The execution of smart contracts is described in greater detail below in reference to FIG. 7.

The modifiable data fields of NFT-VID 200 may include a vehicle operator(s) field 212, which may store identifying information of one or more operators of the vehicle. The identifying information may include one or more operator IDs 214 (e.g., an operator ID 214 for each vehicle operator). An operator ID 214 may be a driver's license or other identification number or code of a respective vehicle operator, or operator ID 214 may reference an NFT-DID of the operator, where the NFT-DID of the operator may include identifying information of the operator. Vehicle operator(s) field 212 may also include an operator smart contract(s) field 216, which may store one or more smart contracts that may be automatically executed when certain conditions of an operator 212 are met with respect to a relevant vehicle 202. For example, a smart contract may establish that vehicle may only be operated by an operator during working hours. When the operator accesses the vehicle, a streaming service running at the vehicle may notify the contract executing VM embedded in a blockchain installed at the vehicle management system, or at the vehicle, or on a different device, of the time of access. If the operator attempts to access the vehicle outside working hours, the contract executing VM may receive the time of access, and the time of access outside the working hours may cause the smart contract to be executed. When the smart contract is executed, instructions to disable vehicle access to the operator may be generated that the contract executing VM sends to the vehicle to be implemented. For example, the instructions may include computer code that when executed enables or disables the access, or the instructions may be converted to computer code at the vehicle ECU. When the code is executed at the vehicle, the operator may be prevented from accessing the vehicle.

The modifiable data fields of NFT-VID 200 may include a assigned digital keys field 218, which may include information on one or more digital keys associated with vehicle 202. For example, a first digital key of the one or more digital keys may be assigned to a first owner of vehicle owners 206. The first digital key may establish that the first owner has access to all functionalities of vehicle 202 at all times. A second digital key of the one or more digital keys may be assigned to a first operator of vehicle operators 212. The second digital key may establish that the first operator has access to vehicle 202 at all times, and has access to a first set of functionalities of vehicle 202. A third digital key of the one or more digital keys may be assigned to a second operator of vehicle operators 212. The third digital key may establish that the second operator has access to vehicle 202 at all times, and has access to a second set of functionalities of vehicle 202. A fourth digital key of the one or more digital keys may be assigned to a third operator of vehicle operators 212. The fourth digital key may establish that the third operator has access to vehicle 202 during certain hours, and has access to a third set of functionalities of vehicle 202, and so on. For example, vehicle 202 may be a tractor shared by a cooperative farm, where different digital keys are used by different members of the cooperative. The first operator may be a member that uses the tractor for a first purpose; the second operator may be a member that uses the tractor for a second purpose; and the third operator may be a member that is allowed to use the tractor during daylight hours; and so on.

FIG. 2B shows an exemplary NFT-DID 250. NFT-DID 250 may include various modifiable and/or immutable data fields. NFT-DID 250 may include an immutable NFT-DID identifier 251, which may be used to reference NFT-DID 250. The immutable data fields may also include a person field 252, which may include identifying information of a person to which NFT-DID 250 corresponds. The person may be an owner or operator of a vehicle, or a person linked to a vehicle or the vehicle management system in a different way. For example, the person may be a former owner of a vehicle, or someone who leases, manages, or works with the vehicle. In various embodiments, a single NFT-DID 250 may correspond to a single person in a 1:1 relationship, where no other NFT-DIDs correspond to the person and no other persons correspond to NFT-DID 250. Person field 252 may include identifying information of the person (e.g., a driver's license), stored, for example, in a modifiable ID number field 254 of the person. Person field 252 may also include other identifying information of the person (e.g., sex, age, certifications, qualifications, training data, etc.). The identifying information may include text data, and/or other types of data such as image data (e.g., an image of the person).

The modifiable data fields of NFT-DID 250 may include an owned vehicle(s) field 256, which may store identifying information of one or more vehicles (e.g., vehicles 202) owned by person 252. The identifying information may be stored in a modifiable vehicle ID field 258, which may include a plurality of vehicle IDs (e.g., one vehicle IDs 258 for each vehicle owned). For example, a vehicle ID 258 may be a VIN number. In some embodiments, a vehicle ID 258 may reference an NFT-VID of an owned vehicle, for example, via an identifier of the NFT-VID, rather referencing the vehicle directly via a vehicle ID (e.g., VIN number). The referenced NFT-VID may include vehicle identifying information, as described above in reference to FIG. 2A.

Additionally, owned vehicle(s) field 256 may include, for one or more owned vehicles 256, one or more owner smart contracts stored in an owner smart contract(s) field 260, which may be automatically executed when certain conditions of person 252 are met with respect to a corresponding owned vehicle 256. The one or more smart contracts may be stored as computer code, which may be executed on a virtual machine embedded in a blockchain such as blockchain 108 of FIG. 1, in response to the certain conditions being met. In some embodiments, the owner smart contracts may be identical to the owner smart contracts of owner smart contracts field 210 of NFT-VID 200. In such cases, a first copy of a smart contract created by a person 252 with reference to a vehicle 202 may be stored in owner smart contract(s) field 260 of NFT-DID 250, and a second copy of the smart contract may be stored in owner smart contract(s) field 210 of NFT-VID 200. Alternatively, references to one or more owner smart contract(s) 260 of NFT-DID 250 may be stored in owner smart contract(s) 210 (e.g., rather than storing two copies of the smart contract), or references to one or more owner smart contract(s) 210 of NFT-VID 200 may be stored in owner smart contract(s) 260 of NFT-DID 250.

The modifiable data fields of NFT-DID 250 may include an operated vehicles field 262, which may store identifying information of one or more vehicles operated by person 252.

The one or more vehicles operated by person 252 may be or include one or more owned vehicle(s) 256 owned by person 252, and/or one or more vehicles operated by person 252 may not be owned by person 252. The identifying information may include one or more vehicle IDs 264 (e.g., one vehicle ID 264 for each operated vehicle 262). Vehicle ID 264 may be a driver's license or other identification number or code of a respective vehicle 202, or vehicle ID 264 may reference an NFT-VID 200 of a vehicle 202 operated by person 252, where the NFT-VID 200 may include identifying information of the vehicle 202 (e.g., vehicle ID 204). Operated vehicles field 262 may also include an operator smart contract(s) field 266, which may store one or more smart contracts that may be automatically executed when certain conditions of person 252 and a linked vehicle 202 are met. In some embodiments, operator smart contracts 266 may be identical to operator smart contracts 216 of NFT-VID 200, where operator smart contracts 266 may include a reference to operator smart contracts 216, or operator smart contracts 216 may include a reference to operator smart contracts 266, or copies of the same smart contract may be stored in both operator smart contracts 266 and operator smart contracts 216.

The modifiable data fields of NFT-DID 250 may include a assigned digital keys field 268, which may include information on one or more digital keys associated with person 252. For example, a first digital key of the one or more digital keys may be created by and for person 252 for a first owned vehicle of owned vehicles 256. The first digital key may establish that person 252 has access to all functionalities of the first owned vehicle at all times. A second digital key of the one or more digital keys may be assigned to person 252 to operate a first operated vehicle of operated vehicles 262. The second digital key may establish that person 252 has access to the first operated vehicle at all times, and has access to a first set of functionalities of the first operated vehicle. A third digital key of the one or more digital keys may be assigned to person 252 to operate a second operated vehicle of operated vehicles 262. The second digital key may establish that person 252 has access to the second operated vehicle at all times, and has access to a second set of functionalities of the second operated vehicle, and so on. For example, person 252 may be an owner of a company vehicle, and may assign various digital keys to different employees of the company to use different functionalities of the company vehicle, depending on experience and training.

Returning to FIG. 1, blockchain 108 may include a contract executing virtual machine (VM) 109 that may execute one or more smart contracts included in an NFT-VID or an NFT-DID, as described above. In various embodiments, vehicle 130 may include an implementation of a streaming service 134 (e.g., an oracle), which may stream real-time event data from vehicle 130 to contract executing VM 109. Contract executing VM 109 may execute the one or more smart contracts based on the real-time event data received from streaming service 134.

In some embodiments, a blockchain 135 may be included in vehicle 130, where blockchain 135 is a copy of blockchain 108. In such embodiments, a contract executing VM 136 of blockchain 135 may be configured to receive the real time data from streaming service 134, and execute the one or more smart contracts stored on blockchain 135 based on the real time data. By including blockchain 135 in vehicle 130, a communication with vehicle management system 102 is not relied on for smart contract execution, whereby a lack of availability of vehicle management system 102 (e.g., due to unexpected downtime, or a lack of connectivity with vehicle 130) may not affect a control of vehicle 130 by the one or more smart contracts. In other embodiments, a copy of blockchain 108 may alternatively or additionally be installed in a device of the operator of vehicle 130, and a contract executing VM of the copy of blockchain 108 may be configured to receive the real time data from streaming service 134, and execute the one or more smart contracts stored on the copy of blockchain 108 based on the real time data.

By including copies of blockchain 108 at vehicle 130 and/or the device of the operator, a distributed ledger may be created, where a validity of the digital key and/or the smart contracts may be verified by a plurality of copies of blockchain 108 at various devices and/or vehicles 130, thus increasing a security of vehicle 130. Additionally, a robustness of vehicle management system 102 to external factors may be increased. For example, in a first condition where execution of the smart contracts is performed at blockchain 108 of vehicle management system 102, a power outage may make vehicle management system 102 unavailable to vehicle 130, whereby vehicle 130 may not be able to access or execute the smart contracts, restricting access or use of vehicle 130. In a second condition where execution of the smart contracts is performed at blockchain 135 of vehicle 130, access to or execution of the smart contracts stored on blockchain 135 may not be affected by the power outage.

In still other embodiments, a copy of blockchain 108 may alternatively or additionally be installed in a device of the operator of vehicle 130, and a contract executing VM of the copy of blockchain 108 may be configured to receive the real time data from streaming service 134, and execute the one or more smart contracts stored on the copy of blockchain 108 based on the real time data.

In yet other embodiments, an owner's copy of blockchain 108 may alternatively or additionally be installed in a device of one or more of vehicle owners 137, where the owner's copy of blockchain 108 may be used to fulfill requirements of a distributed ledger. The owner's copy of blockchain 108 may be consulted to authenticate the operator and/or validate the smart contracts. However, the owner's copy of blockchain 108 may or may not include a contract executing VM configured to listen for the real-time event data streamed by streaming service 134 and execute the smart contracts based on the real-time event data. For example, vehicle 130 may not include blockchain 135, and the real-time event data streamed by streaming service 134 may be received by contract executing VM 109, which may execute one or more smart contracts based on the real-time event data. Prior to executing the one or more smart contracts, vehicle management system 102 may validate the one or more smart contracts by comparing the one or more smart contracts with copies of the one or more smart contracts stored on other copies of blockchain 108 stored at owner devices. After validation, when the one or more smart contracts are executed, contract executing VM 109 may transmit instructions to vehicle 130. The instructions may be executed at ECU 132, which may enable or disable access to and/or the use of one or more functionalities of vehicle 130. In some embodiments, the instructions may include computer code to be executed at the vehicle to enable or disable the access. In other embodiments, the instructions may be converted into computer code at ECU 132. An advantage of using the owner's copy of blockchain 108 for validation and the (master copy of) blockchain 108 at vehicle management system 102 for contract execution, is that blockchain 135 may not be included in the digital key and installed at vehicle 130 and/or an operator device, which may reduce a size of the digital key transmitted wirelessly by vehicle management system 102 and reduce an amount of resources consumed by the operator device and/or ECU 132.

Non-transitory memory 104 of vehicle management system 102 may include an NFT-VID management module 112, which may which may comprise instructions for managing the NFT-VIDs that are stored on blockchain 108. Similarly, non-transitory memory 104 may include an NFT-DID management module 114, which may which may comprise instructions for managing the NFT-DIDs that are stored on blockchain 108. In various embodiments, NFT-VID management module 112 and NFT-DID management module 114 may include instructions that, when executed by processor(s) 106, cause vehicle management system 102 to conduct one or more of the steps of method 400 for creating, storing, and updating the NFT-VIDs and NFT-DIDs, respectively, discussed in more detail below in reference to FIG. 4.

Vehicle management system 102 may include a digital key management module 116, which may comprise instructions for managing revocable digital keys stored in the NFT-VIDs and/or NFT-DIDs that are stored on blockchain 108. Digital key management module 116 may include instructions that, when executed by processor(s) 106, cause vehicle management system 102 to conduct one or more of the steps of method 500 for creating and updating the digital keys in the NFT-VIDs and/or NFT-DIDs that are stored on blockchain 108, discussed in more detail below in reference to FIG. 5.

Vehicle management system 102 may be operably/communicatively coupled to a user input device 120 and a display device 124. User input device 120 may comprise one or more of a touchscreen, a keyboard, a mouse, a trackpad, a motion sensing camera, or other device configured to enable a user to interact with and manipulate data within vehicle management system 102. In one example, user input device 120 may enable a user to perform various actions with respect to managing access and/or operational permissions for vehicle 130, including but not limited to recording a purchase/sale or new owner of vehicle 130 on blockchain 108 and managing issuance and use of one or more digital keys for vehicle 130. Display device 124 may include one or more display devices utilizing virtually any type of technology. In some embodiments, display device 124 may comprise a computer monitor on which data of vehicle 130, vehicle owner(s) 136, and/or vehicle operator(s) 138 may be displayed. Display device 124 may be combined with processor(s) 106, non-transitory memory 104, and/or user input device 120 in a shared enclosure, or may be peripheral display devices and may comprise a monitor, touchscreen, projector, or other display device known in the art, which may enable a user to and/or interact with various data stored in non-transitory memory 104.

Figure 3:
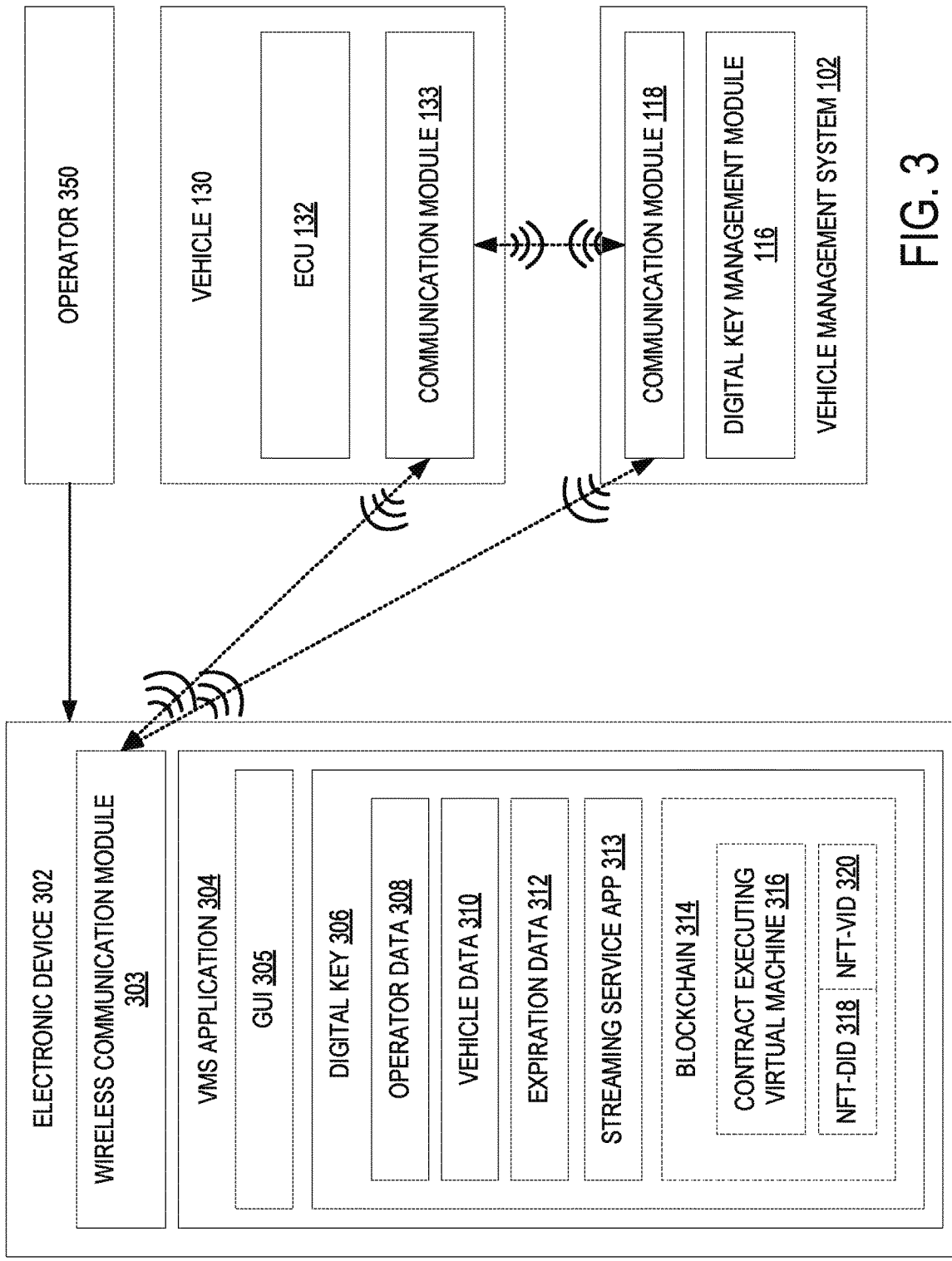
FIG. 3 is a schematic block diagram of a digital key system for a vehicle, according to an embodiment.

Referring now to FIG. 3, a digital key system 300 is shown, including an electronic device 302 on which a vehicle management system (VMS) application 304 has been installed, where VMS application 304 includes a digital key 306. In some embodiments, digital key 306 may not be included in VMS application 304, and may be stored in a memory of electronic device 302 outside VMS application 304. VMS application 304 may be an app (or application for a PC) downloaded and installed from a website of vehicle management system 102 of FIG. 1. VMS application 304 may allow a user of electronic device 302 (e.g., an operator or owner of a vehicle) to interact with and/or use various functionalities of vehicle management system 102. For example, an owner of a vehicle may use VMS application 304 to create or update digital key 306, to transfer digital key 306 to an operator of the vehicle, to access vehicle and/or operator data stored in one or more NFTs stored on a blockchain of vehicle management system 102 or a copy of the blockchain stored in digital key 306, and other functionalities.

Digital key 306 which may be used by an operator 350 to gain access to vehicle 130 of FIG. 1, in conjunction with vehicle management system 102. Specifically, electronic device 302 includes a wireless communication module 303, which may manage wireless communications with communication module 133 of vehicle 130 and/or digital key management module 116 of vehicle management system 102 described above. In various embodiments, electronic device 302 is a smart phone of operator 350.

In various embodiments, vehicle 130 may have an RKE system, where operator 350 may request access to vehicle 130 when electronic device 302 is within a threshold proximity. For example, when electronic device 302 is within the threshold proximity, VMS application 304 may be launched, whereby a GUI 305 of VMS application 304 may be displayed on electronic device 302 for requesting access to vehicle 130. In some embodiments, operator 350 may select a control element of the application in GUI 305 to request the access when inside the threshold proximity. In other embodiments, the RKE is a PKE system, and VMS application 304 may automatically request the access when inside the threshold proximity. When the access is requested, digital key 306 may be transmitted to communication module 133. When digital key 306 is received at communication module 133, digital key 306 and/or operator 350 may be authenticated.

In an embodiment, authentication of one or both of digital key 306 and operator 350 may be carried out by vehicle management system 102. For example, information of operator 350 and/or digital key 306 may be transmitted wirelessly from communication module 133 to communication module 107 of vehicle management system 102. The information of operator 350 and/or digital key 306 may be processed by vehicle management system 102 (e.g., by executing code of digital key management module 116) to authenticate operator 350 and/or digital key 306. If operator 350 and/or digital key 306 are authenticated, vehicle management system 102 may transmit a successful authentication from communication module 107 to communication module 133 of vehicle 130, and ECU 132 of vehicle 130 may unlock one or more doors of vehicle 130 to allow operator 350 access to vehicle 130. Authentication of the information of operator 350 and/or digital key 306 at vehicle management system 102 is described in greater detail below in reference to FIG. 6.

In other embodiments, the information of operator 350 and/or digital key 306 received at communication module 133 may be sent to ECU 132 of vehicle 130 to be authenticated, or the information of operator 350 and/or digital key 306 may be transmitted from wireless communication module 303 of electronic device 302 to communication module 107 of vehicle management system 102 to be authenticated prior to transmitting digital key 306 to ECU 132 to access vehicle 130.

Figure 6:
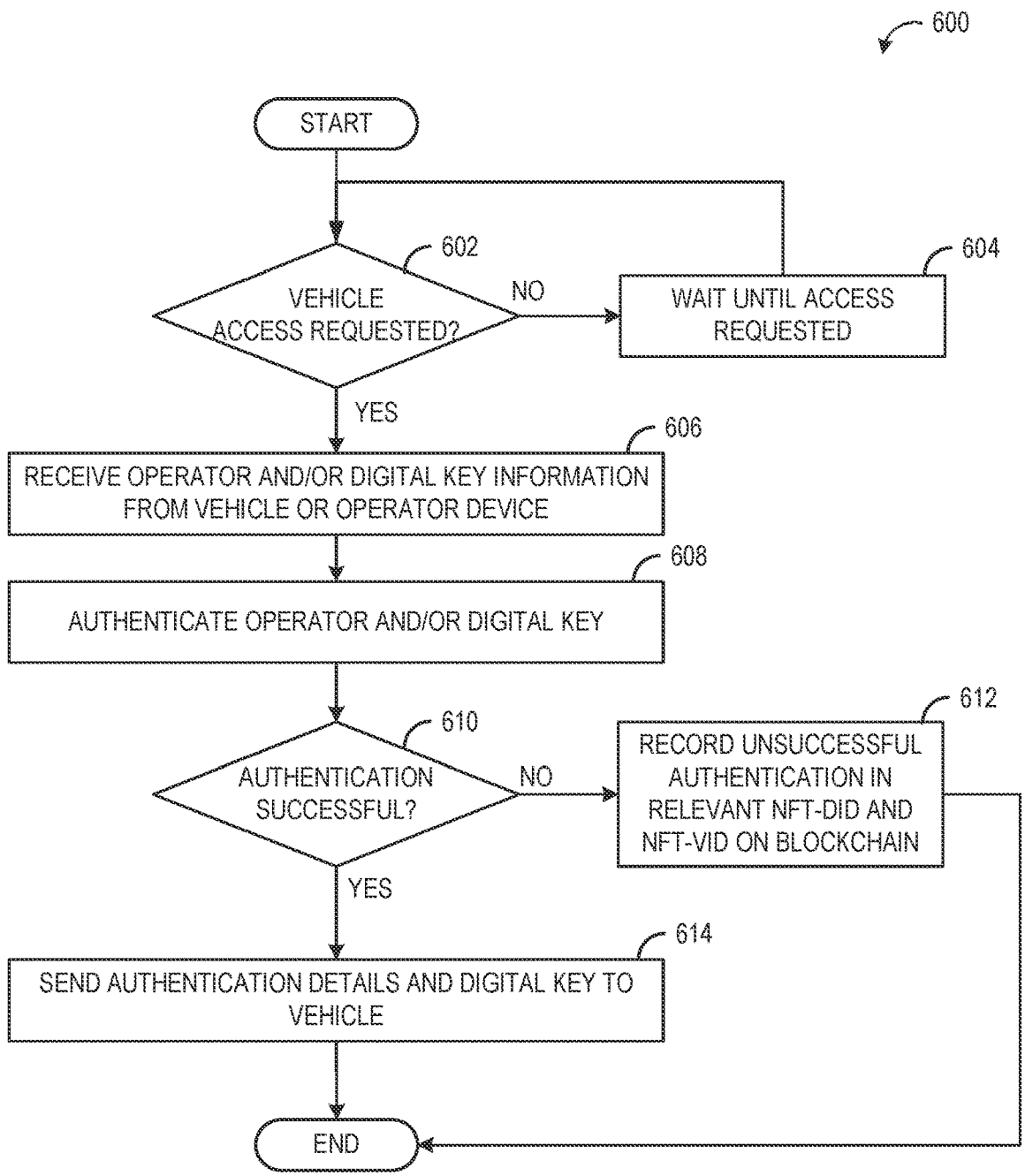
FIG. 6 is a flowchart that illustrates an exemplary method for a vehicle management system for authenticating an operator of a vehicle, according to an embodiment.

Referring to FIG. 6, an exemplary method 600 is shown for authenticating an operator of a vehicle (e.g., operator 350 of vehicle 130) and/or a digital key (e.g., digital key 306) of the operator. Method 600 may be executed by a processor of a vehicle management system, such as processor 106 of vehicle management system 102.

Method 600 begins at 602, where method 600 includes determining whether access to a vehicle has been requested by the operator. As described above, access to the vehicle may be requested when the operator enters a threshold proximity of the vehicle. When access to the vehicle is requested, the vehicle may transmit details of the access request to the vehicle management system (e.g., to communication module 107 of vehicle management system 102). The details of the access request may include identifying information of the operator, the digital key, and/or specific details of the digital key. If at 602 it is determined that access to the vehicle has not been requested, method 600 proceeds to 604. At 604, method 600 includes waiting until access is requested, and method 600 proceeds back to 602.

At 606, method 600 includes receiving operator identifying information and/or information of the digital key. In some embodiments the operator identifying information and/or information of the digital key may be received from the vehicle (e.g., communication module 133 of vehicle 130) or an electronic device of the operator (e.g., wireless communication module 303 of electronic device 302). In some embodiments, the operator identifying information may be sent separately from the digital key, while in other embodiments, the operator identifying information may be extracted from the digital key.

At 608, at 600 includes authenticating the operator and/or digital key information. Authenticating the operator and/or digital key information may include comparing identifying information of the operator with identifying information of the operator stored at the vehicle management system. In various embodiments, the identifying information of the operator and/or digital key information may be stored in one or more of an NFT of the operator (e.g., NFT-DID 250) and an NFT of the vehicle (e.g., NFT-VID 200) on a blockchain (e.g., blockchain 108). For example, authentication code stored in non-transitory memory of the vehicle management system (e.g., in digital key management module 116) may extract the NFT of the operator from the blockchain and determine whether the operator identifying information matches the identifying information of the operator stored in the NFT of the operator. If the information matches, the operator may be authenticated. Similarly, the authentication code may extract the NFT of the vehicle from the blockchain, and determine whether the digital key (or digital key information) matches a digital key for the vehicle recorded in the vehicle NFT (e.g., in assigned digital keys field 218). In some embodiments, facial recognition software may be used to compare an image of the operator generated by a camera of an operator smart phone with an image of the operator stored in the NFT of the operator. It should be appreciated that various different techniques and technologies may be used to authenticate the operator, and the examples provided herein are for illustration and non-limiting.

At 610, method 600 includes determining whether the authentication of the operator and/or digital key was successful. If at 610 it is determined that the authentication of the operator and/or digital key was successful, method 600 proceeds to 614. At 614, at the 600 includes sending details of the authentication and/or the digital key to the vehicle. The details of the authentication may include an indication that the authentication was successful. The details of the authentication may also include instructions to the vehicle to grant access to the operator.

Alternatively, if at 610 is determined that the authentication was not successful, method 600 proceeds to 612. At 612, method 600 includes recording the unsuccessful authentication in the NFT of the operator and/or the NFT of the vehicle stored on the blockchain at the vehicle management system. For example, the unsuccessful authentication may be stored in a reference to the digital key assigned to the operator (e.g., in assigned digital keys fields 218/268). In this way, an owner of the vehicle may consult the NFTs (e.g., via a GUI of the vehicle management system) to view successful and unsuccessful authentication attempts regarding digital keys that the owner has assigned for a vehicle or to an operator of a vehicle. Method 600 ends.

Returning to FIG. 3, digital key 306 includes various information of the operator and vehicle. The information may include, for example, operator data 308 (e.g., identifying information of the operator), vehicle data 310 (e.g., identification information of the vehicle), and expiration data 312 of the digital key, such as an indication of a time period during which the digital key is valid, and/or a time at which the digital key ceases to be valid and can no longer be used to access the vehicle. In some embodiments, expiration data 312 may additionally or alternatively include rules that establish conditions under which digital key 306 may expire or be revoked. The rules may be established in one or more smart contracts, for example, stored in operator smart contracts 216 of an NFT-VID associated with vehicle 130 or in operator smart contracts 266 of an NFT-DID associated with the operator, which may be stored in a blockchain as described above. For example, an owner of vehicle 130 may write a smart contract for the operator of vehicle 130 that specifies that digital key 306 expires on an expiration date of a driver's license of the operator, or that digital key 306 expires in the event that the operator is involved in an accident, or under one or more other conditions. In general, terms and conditions may be established that, when no longer satisfied, cause digital key 306 to expire. When digital key expires or is revoked, access and/or usage permissions for the vehicle associated with digital key 306 may be removed from an NFT-VID of the vehicle and/or an NFT-DID of the operator. In such cases, VMS application 304 may send a notification to the operator and/or the owner of the vehicle.

Digital key 306 may also include a streaming service application 313, which may be transmitted to the vehicle and launched at an ECU of the vehicle to initiate a streaming service (e.g., an oracle for smart contract execution on a blockchain). The streaming service may stream real-time event data of the vehicle to a contract executing VM embedded in a master copy of a blockchain of the vehicle management system (e.g., blockchain 108). The contract executing VM may execute one or more smart contracts relating to the operator and/or the vehicle based on the received event data, as described in greater detail below in reference to FIG. 7.

In some embodiments, digital key 306 may additionally include a blockchain 314, which may be a version or copy of the master copy of the blockchain of the vehicle management system. Blockchain 314 may include a contract executing VM 316, which may be the same as the contract executing VM embedded in the master copy. Blockchain 314 may also include a stored copy of an NFT-VID 320 of the vehicle and an NFT-DID 318 of the operator, which may be copies of NFT-VID 200 and NFT-DID 250 of FIGS. 2A and 2B, respectively. Blockchain 314 may be transmitted to vehicle 130 after a successful authentication and installed in ECU 132, where contract executing VM 316 may be configured to receive the real-time event data streamed by the streaming service initiated at the vehicle. When blockchain 314 is installed in ECU 132, ECU 132 may manage access to vehicle 130 without relying on vehicle management system 102. For example, communication module 133 of vehicle 130 may not be able to establish contact with communication module 107 of vehicle management system 102, for example, due to internet connectivity issues or technical problems at vehicle management system 102. Thus, in the event of such issues or problems, control over vehicle 130, including access to vehicle 130 and the use of one or more functionalities of vehicle 130, may be maintained in accordance with the one or more smart contracts stored in NFT-DID 318 and/or NFT-VID 320 of blockchain 314, resulting in a more robust implementation of the control than may be achieved when relying on communication with vehicle management system 102. Additionally, by decreasing an amount of communication with vehicle management system 102, a consumption of memory and processing resources of vehicle management system may be decreased and offloaded to vehicle 130, reducing a cost of operating vehicle management system 102 and a potential for delays and technical problems occurring at vehicle management system 102.

Figure 4:
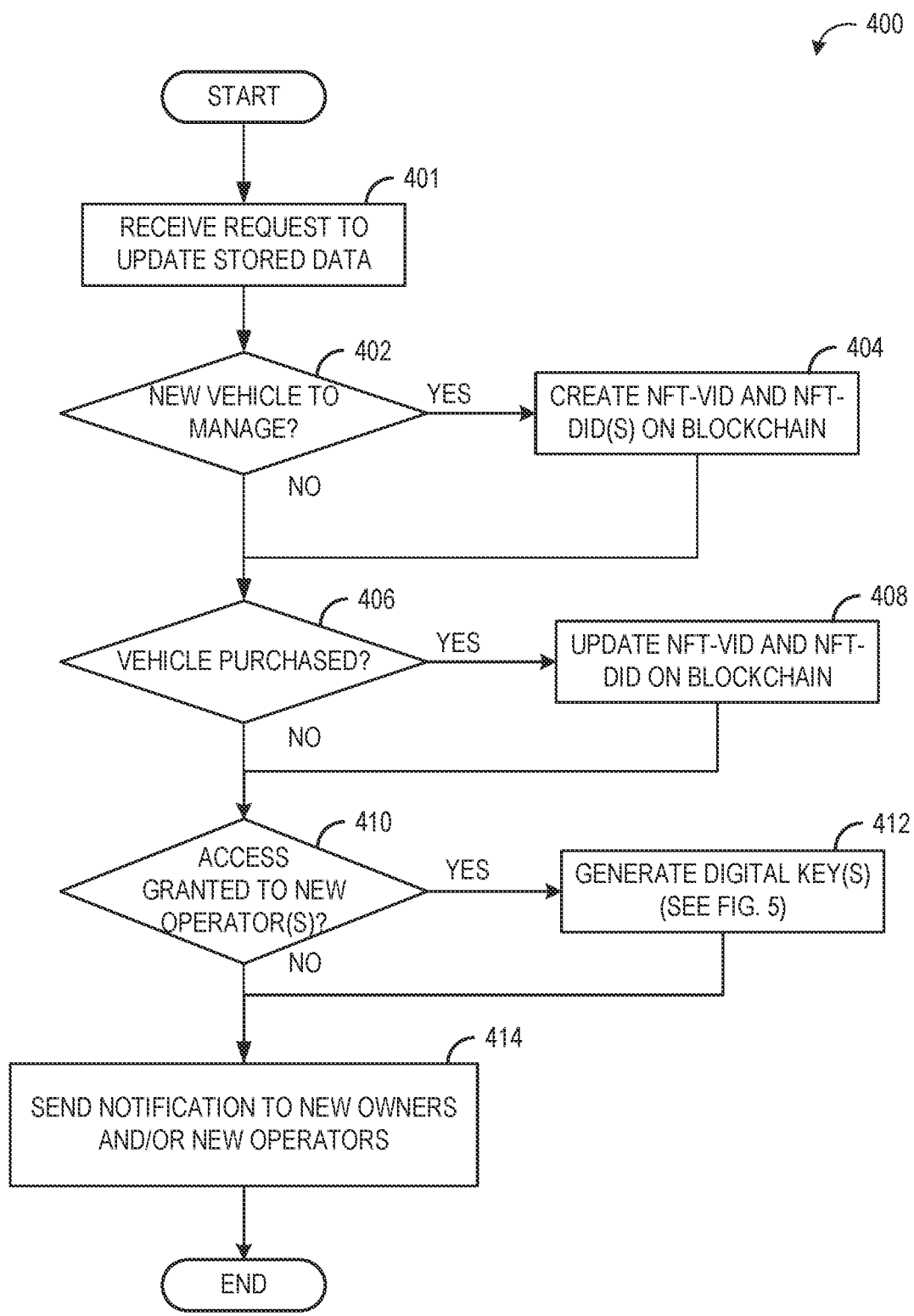
FIG. 4 is a flowchart that illustrates an exemplary method for managing data of a vehicle management system on a blockchain, according to an embodiment.

FIG. 4 shows an exemplary method 400 for managing the storing of data of a vehicle, data of an owner of the vehicle, and data of an operator of the vehicle on a blockchain installed in a vehicle management system, such as vehicle management system 102 of FIG. 1. Method 400 may be executed by a processor of the vehicle management system, (e.g., processor 106), based on instructions stored in a memory (e.g., memory 104) of the vehicle management system. For example, the instructions may be stored in a digital key management module (e.g, digital key management module 116) of the memory, or in an NFT-VID management module (e.g, NFT-VID management module 112) of the memory, or in an NFT-DID management module (e.g, NFT-DID management module 114) of the memory. The vehicle data, owner data, and/or operator data may be used by the vehicle management system during generation of a digital key granting access to the vehicle to one or more operators and/or owners of the vehicle, as described herein.

Method 400 begins at 401, where method 400 includes receiving a request to update data stored in the blockchain of the vehicle management system.

At 402, method 400 includes determining whether the request indicates a new vehicle to be managed by the vehicle management system. If it is determined at 402 that the request does not indicate a new vehicle to be managed by the vehicle management system, method 400 proceeds to 406. If it is determined at 402 that the request indicates a new vehicle to be managed, method 400 proceeds to 404. At 404, method 400 includes creating an NFT-VID for the vehicle (e.g., NFT-VID 200 of FIG. 2A) on the blockchain, and one or more NFT-DIDs for one or more owners and one or more operators of the vehicle. The NFT-VID and the NFT-DID may be created based on information extracted from the request. For example, the information may include information of the vehicle, information of one or more owners of the vehicle, and information of one or more operators of the vehicle, which may include the one or more owners. The information may be written into fields of the NFT-VID as described above in reference to FIG. 2A, and written into fields of the NFT-DID as described above in reference to FIG. 2B. When the NFT-VID for the vehicle and the one or more NFT-DIDs for owners and operators of the vehicle have been created, the NFT-VID and the one or more NFT-DIDs may be stored in the blockchain. Specifically, the NFT-VID and the one or more NFT-DIDs may be written to a current block of data, where the current block of data is incorporated into the blockchain via one or more procedures known in the art. Method 400 may then proceed to 406.

At 406, method 400 includes determining whether the request indicates that a vehicle managed by the vehicle management system has been purchased, where the vehicle has one or more new owners. If it is determined at 406 that the request does not indicate that a vehicle managed by the vehicle management system has been purchased and has new owners, method 400 proceeds to 410. If it is determined at 406 that the request indicates the vehicle has one or more new owners, method 400 proceeds to 408. At 408, method 400 includes updating the NFT-VID for the vehicle stored on the blockchain with the one or more new owners, and updating one or more NFT-DIDs for one or more new owners. The NFT-VID and the one or more NFT-DIDs may be updated based on information extracted from the request. For example, in some embodiments, when the NFT-VID is updated, identifying information of one or more previous owners listed in a vehicle owners field (e.g., vehicle owner (s) 206) may be deleted and replaced with the one or more new owners. In other embodiments, the identifying information of the one or more previous owners listed in the vehicle owners field may not be removed from the NFT-VID, and may be marked as previous owners, or stored in a separate field for previous owners of the vehicle.

If the new owner is already recorded in an NFT-DID stored in the blockchain of the vehicle management system, the NFT-DID for the new owner may be updated to reflect the new owner's ownership of the vehicle. For example, the vehicle may be added to an owned vehicles field (e.g., owned vehicles 256) of the NFT-DID of the new owner. If the new owner operates the vehicle, the vehicle may be added to an operated vehicles field (e.g., operated vehicles 262) of the NFT-DID. If the new owner is not already recorded in an NFT-DID stored in the blockchain of the vehicle management system, a new NFT-DID for the new owner may be created with information included in the request, as described above.

Similarly, when the one or more NFT-DIDs of the new owners are updated, one or more NFT-DIDs of the previous owners may be updated to remove the vehicle from the owned vehicles field. In some embodiments, the vehicle may not be removed from the NFT-DIDs of the one or more previous owners, and may be marked as previously owned vehicles, or stored in a separate field of the NFT-DIDs for previously owned vehicles.

When the NFT-VID for the vehicle and the one or more NFT-DIDs for owners of the vehicle have been updated, the NFT-VID and the one or more NFT-DIDs may be stored in the blockchain. Method 400 may then proceed to 410.

At 410, method 400 includes determining whether the request indicates that access to a vehicle managed by the vehicle management system has been granted to one or more new operators, which may include one or more new owners, If it is determined at 410 that the request does not indicate that access to a vehicle managed by the vehicle management system has been granted to one or more new operators, method 400 proceeds to 414. If it is determined at 410 that the request indicates that access to a vehicle managed by the vehicle management system has been granted to one or more new operators, method 400 proceeds to 412. At 412, method 400 includes generating one or more digital keys for the vehicle to be granted to the one or more new operators. Generating the digital keys is described in greater detail below in relation to FIG. 5. After generating the digital keys, the NFT-VID for the vehicle stored on the blockchain may be updated with the one or more digital keys, and one or more NFT-DIDs of the one or more new operators may be updated with the one or more digital keys. For example, the generated digital keys may be stored in an assigned digital keys field of the NFT-VID of the vehicle (e.g., assigned digital keys field 218) and/or an assigned digital keys field of the NFT-DIDs of the one or more new operators (e.g., assigned digital keys field 268).

Additionally, the request may provide instructions to delete one or more previous digital keys to the vehicle assigned to previous operators of the vehicle, for example, if the vehicle has a new owner. Alternatively, in some cases, one or more previous digital keys to the vehicle assigned to previous operators of the vehicle may not be deleted and may remain valid. For example, the vehicle may not have a change of ownership, and access to the vehicle may be granted to a new operator without altering digital keys assigned to other current operators.

When the NFT-VID for the vehicle and the one or more NFT-DIDs for the new operators of the vehicle have been updated, the NFT-VID and the one or more NFT-DIDs may be stored in the blockchain. Method 400 may then proceed to 414.

As an example, in contrast to other digital key systems, the vehicle management system described herein based the use of NFTs in a distributed ledger to store vehicle and vehicle owner/operator data may allow for flexibly tracking various changing potentially complex relationships between a vehicle and various owners and/or operators over the course of a lifetime of the vehicle. For example, a record of ownership of a vehicle by a first party may be stored via one or more NFTs in a first entry of the distributed ledger (e.g., a blockchain). The one or more NFTs may include an NFT-VID of the vehicle, and/or an NFT-DID of an owner. A record of a lease of the vehicle from the first party to a second party may be stored in a second entry of the distributed ledger, where the NFT-VID and NFT-DID may be updated in the distributed ledger. A record of a permission to use the vehicle may be stored in a third entry of the distributed ledger, the third entry updating the NFT-VID of the vehicle and the NFT-DID of the owner, and adding a new NFT-DID of the operator. Over time, the owners and/or operators may change and be updated, for example, by an owner. Due to known properties and advantages of a distributed ledger system, current and historical information of the vehicle, owner, and operator may securely stored and accessed at any time, with a lower probability of intrusion and/or alteration by an unauthorized individual than with a different kind of vehicle management system not using a distributed ledger. In this way, a reliable and trustworthy set of records for the vehicle and entities associated with the vehicle may be efficiently managed, without relying on centralized code of the vehicle management system.

At 414, method 400 includes sending a notification of the creation or updating of an NFT-VID and an NFT-DID to relevant new owners and new operators of the vehicle, and method 400 ends.

Figure 5:
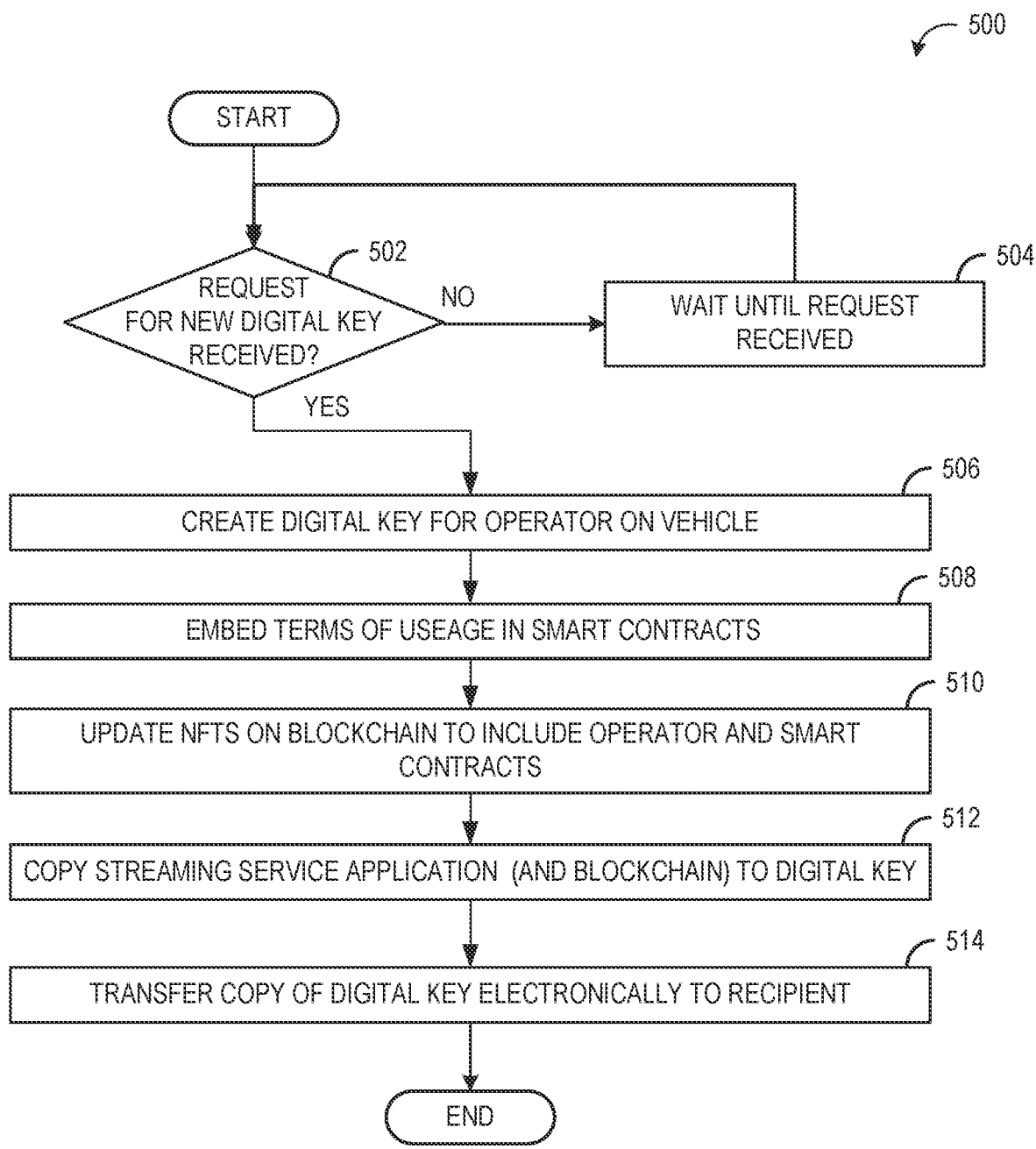
FIG. 5 is a flowchart that illustrates an exemplary method for creating a digital key for a vehicle, according to an embodiment.

Referring now to FIG. 5, an exemplary method 500 is shown for creating a digital key of a vehicle of a vehicle management system, such as vehicle management system 102 of FIG. 1, to be transmitted to an operator of the vehicle to use the vehicle. Method 500 may be executed by a processor of the vehicle management system, (e.g., processor 106), based on instructions stored in a memory (e.g., memory 104) of the vehicle management system. For example, the instructions may be stored in one or more of a digital key management module (e.g, digital key management module 116) of the memory, an NFT-VID management module (e.g, NFT-VID management module 112) memory, and an NFT-DID management module (e.g, NFT-DID management module 114) of the memory.

Method 500 begins at 502, where method 500 includes determining whether a request for a new digital key has been received. In some embodiments, the request for the new digital key may be generated by the vehicle management system in response to a request to register a new operator of the vehicle, for example, as a result of the vehicle being purchased by a new owner. In some embodiments, the request may be initiated automatically by the vehicle management system when the purchase is recorded in the vehicle management system. In such cases, default terms of usage (e.g., permissions) with respect to access and use of the vehicle may be included in the request. For example, the default terms of usage may specify that the new operator has full access to the vehicle, and no functionalities of the vehicle may be disabled for the new operator.

In other embodiments, the request may be initiated by the new owner using a GUI of an application of the vehicle management system (e.g., GUI 305 of VMS application 304). For example, the new owner may access the GUI by logging into the vehicle management system on a browser of a computer or an app of a computing device (e.g., electronic device 302) of the new owner. The new owner may enter terms of usage for accessing and/or using the vehicle into the GUI, and the GUI may generate the request based on the data entered in by the new owner. In some cases, the new owner may open an existing digital key to the vehicle in the GUI, and modify data of the existing digital key. For example, a digital key may be generated automatically by the vehicle management system with the default terms of usage, and the new owner may open the automatically generated digital key and replace the default terms of usage with different desired terms of usage for the new operator.

If it is determined at 502 that the request for the new digital key has not been received, method 500 proceeds to 504. At 504, method 500 includes waiting until the request is received, and method 500 proceeds back to 502.

If it is determined at 502 that the request for the new digital key has been received, method 500 proceeds to 506. At 506, method 500 includes creating a new digital key for the operator. In various embodiments, the new digital key may be created based on information included in the request (e.g., included by default or specified by the new owner). The digital key may be a non-limiting version of digital key 306 of FIG. 3, and may include fields for data of the operator (e.g., operator data 308), and data of the vehicle (e.g., vehicle data 310), which may be extracted from the request. The digital key may include a field for expiration data of the digital key (e.g., expiration data 312), which may include an expiration date and/or terms under which the digital key may be invalidated. If an expiration date is passed, In some embodiments, the information may be extracted from one or more NFTs included in the request. For example, the request may include an NFT-VID for the vehicle (e.g., NFT-VID 200 of FIG. 2A), and an NFT-DID for the operator, where the NFT-VID and the NFT-DID may be stored in a blockchain of the vehicle management system, as described above in reference to FIG. 4.

At 508, method 500 includes embedding or updating the terms of usage in one or more smart contracts. In various embodiments, the desired terms of usage for operating the vehicle may be written into one or more smart contracts that are automatically executed when certain conditions are met. The one or more smart contracts may be executed by a contract executing VM (e.g., contract executing VM 109 or contract executing VM 316) embedded in a blockchain installed at the vehicle management system or at the vehicle (e.g., blockchain 108 or blockchain 314). Determining whether the certain conditions have been met may be based on the real-time event data streamed to the contract executing VM by a streaming service (e.g., streaming service 134) installed and implemented at the vehicle. For example, the streaming service may be implemented by an ECU of the vehicle (e.g., ECU 132 of vehicle 130).

At 510, method 500 includes updating the one or more NFTs on the blockchain to include data of the new operator and the one or more smart contracts. As described above in reference to FIGS. 2A and 2B, details of a vehicle are stored in an NFT-VID associated with the vehicle, and details of an owner or an operator are stored in an NFT-DID associated with the owner or operator, respectively.

At 512, method 500 includes copying a streaming service application (e.g., streaming service app 313) to the digital key. When the digital key is used to gain access to the vehicle, the streaming service application may be transferred to the vehicle, and launched, for example, by the ECU of the vehicle, to initiate the streaming service as described above. The streaming service may transmit real-time event data to the contract executing VM embedded in the blockchain, where the real-time event data may cause the contract executing VM to execute one or more of the one or more smart contracts.

In various embodiments, a version of the blockchain stored at the vehicle management system (e.g., blockchain 108) may be copied to the digital key. When the digital key is used to gain access to the vehicle, the version of the blockchain (e.g., blockchain 314) may be transferred to the vehicle and stored, for example, in a memory of the ECU. By storing the version of the blockchain at the vehicle, the real-time event data streamed by the streaming service may be received by a version of the contract executing VM embedded in the version of the blockchain stored at the vehicle, and the smart contracts may be executed by the contract executing VM based on the real-time event data, rather than relying on the vehicle management system to execute the smart contracts and transmit results of the execution to the vehicle. By not relying on the vehicle management system to execute the smart contracts, the contract execution may be performed more quickly and reliably, for example, even when the vehicle loses connectivity to the vehicle management system.

At 514, method 500 includes transferring a copy of the digital key electronically (e.g., wirelessly) to the new operator. In various embodiments, the copy of the digital key may be transferred to an electronic device of the new operator, such as a smart phone. In some embodiments, the copy of the digital key may be installed in a dedicated physical device to be used by the new operator, such as a key fob.

As an example, a company may be an owner of a vehicle, and may hire a new operator to operate the vehicle. A digital key may be created for the new operator by a manager of the company, via the GUI of the vehicle management system. When the manager creates the digital key, the manager may create a smart contract establishing that the new operator has permission to access and use the vehicle during working hours of the company, but does not have permission to access and operate the vehicle outside of the working hours. The smart contract may be generated based on data inputted by the manager, for example, into one or more fields of a contract creation wizard displayed in the GUI. The vehicle management system may retrieve an NFT-VID of the vehicle from the blockchain and create (or retrieve from the blockchain) an NFT-DID for the new operator. The new operator may be saved in the NFT-VID, for example, in vehicle operator(s) field 212. The smart contract may be saved in the NFT-VID, for example, in operator smart contract(s) field 216. The vehicle may be saved in the NFT-DID of the new operator, for example, in operated vehicle(s) 262. The smart contract may be saved in the NFT-DID, for example, in operator smart contract(s) field 266. Additionally, an identifier of the digital key may be saved in the NFT-VID and the NFT-DID, for example, in assigned digital keys field 218 and assigned digital keys field 268, respectively. After the NFT-VID and the NFT-DID have been updated, the updated NFT-VID and the updated NFT-DID may be saved on the blockchain.

The manager may select a control element such as a checkbox to include a version of the blockchain in the vehicle, such that contract execution to enforce the terms of usage is carried out at the vehicle, and not at the vehicle management system. If the manager selects the control element to include the version of the blockchain in the vehicle, a copy of the blockchain stored at the vehicle management system may be stored in the digital key. If the manager does not select the control element to include the version of the blockchain in the vehicle, a copy of the blockchain stored at the vehicle management system may not be stored in the digital key, whereby enforcement of the smart contract may be carried out at the vehicle management system. When a contract is executed, the contract may generate instructions and/or computer code that may be implemented by an ECU of the vehicle to control access to and/or usage of one or more functionalities of the vehicle.

After the manager is done specifying the desired terms of usage of the vehicle in the smart contracts, the manager may select a control element in the GUI to generate the digital key. The vehicle management system may generate the digital key based on the manager input. The vehicle management system may copy an app to implement the streaming service at the vehicle to the digital key, and the digital key may be transmitted wirelessly to the new operator.

Figure 7:
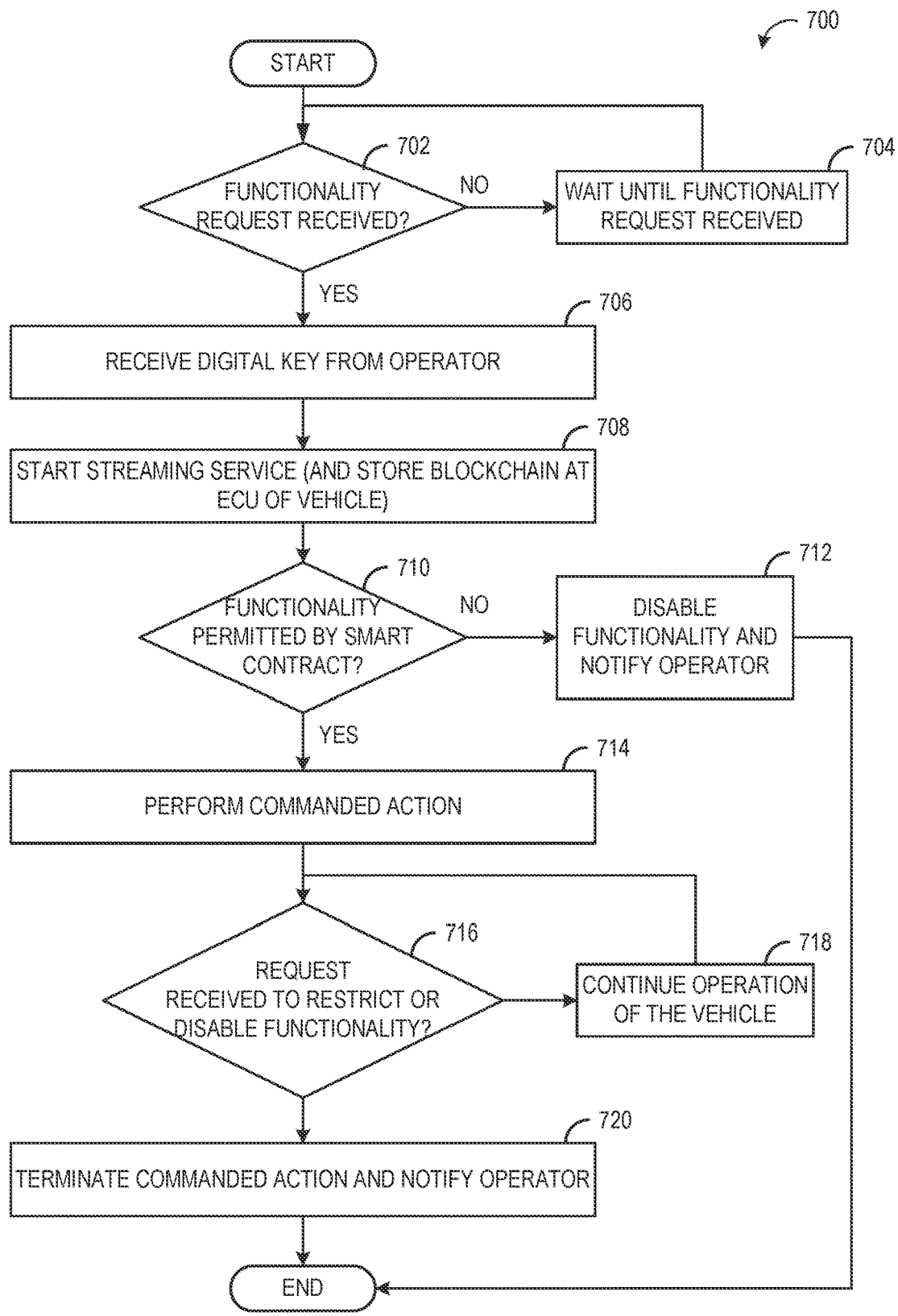
FIG. 7 is a flowchart that illustrates an exemplary method for a vehicle for controlling a functionality of the vehicle based on a smart contract, according to an embodiment.

Referring now to FIG. 7, an exemplary method 700 is shown for controlling access to a vehicle and usage of vehicle functionalities by an operator, based on a digital key of the operator. The access and usage may be controlled by one or more smart contracts, as described above in reference to FIG. 5. Method 700 may be executed by an ECU of the vehicle, in accordance with instructions stored in a memory of the ECU.

Method 700 begins at 702, where method 700 includes determining whether a request to use a functionality of the vehicle has been received. For the purposes of method 700, the functionality may include opening a door of the vehicle to gain access to the vehicle. The request to use the functionality may be generated by the operator. The request to use the functionality may be generated as a result of the operator commanding an action to initiate use of the functionality, for example, via one or more controls of the vehicle. For example, a request to access the vehicle may be generated when an electronic device of the operator storing the digital key enters a threshold proximity of the vehicle, or a request to operate the vehicle in a specific mode of operation may be generated when the operator selects a button or similar control on a dashboard of the vehicle.

If it is determined at 702 that a request to use a functionality of the vehicle has not been received, method 700 proceeds to 704. At 704, method 700 includes waiting until the request is received, and method 700 proceeds back to 702.

If it is determined at 702 that the request to use a functionality of the vehicle has been received, method 700 proceeds to 706. At 706, method 700 includes receiving a digital key from the electronic device of the operator. The digital key may establish terms of usage of the vehicle that apply to the operator, as described above in reference to FIG. 5. In some embodiments, the digital key may be transferred automatically to the vehicle when the operator enters within the threshold proximity of the vehicle.

At 708, method 700 includes launching a streaming service application stored in the digital key to initiate a streaming service (e.g., streaming service 134). Streaming service 134 may stream real-time event data of the vehicle to a contract executing VM embedded in a blockchain, where smart contracts applicable to the operator and the vehicle are included in one or more NFTs stored on the blockchain. In some embodiments, the blockchain may be stored at a vehicle management system (e.g., vehicle management system 102), where the smart contracts applicable to the operator and the vehicle are automatically executed at the vehicle management system based on the real-time event data streamed from the vehicle. In other embodiments, a copy of the blockchain stored at the vehicle management system may be included in the digital key, whereby the copy of the blockchain may be transferred to the vehicle and stored at the vehicle. In such embodiments, the smart contracts applicable to the operator and the vehicle may be automatically executed at the vehicle, without relying on the vehicle management system.

At 710, method 700 includes determining whether the requested functionality is permitted by the terms of usage established in the smart contract. If the requested functionality is permitted by the terms of usage established in the smart contract, the smart contract may not automatically execute based on the real-time event data. If the smart contract is not automatically executed based on the real-time event data, it may be assumed that the terms of usage allow the operator to use the requested functionality. Alternatively, if the smart contract is automatically executed based on the real-time event data, instructions including operational code restricting, disabling, or enabling the requested functionality may be transmitted from the contract executing VM to the ECU of the vehicle. The ECU of the vehicle may execute the operational code to enforce the terms of usage for the operator.

If at 710 it is determined that the requested functionality is not permitted by the smart contract (e.g., the smart contract is executed and the instructions including operational code are transmitted to the vehicle), method 700 proceeds to 712. At 712, method 700 includes restricting or disabling the requested functionality by implementing the operational code, and notifying the operator that the requested functionality is not permitted by the terms of usage applicable to the operator.

If at 710 it is determined that the requested functionality is permitted by the smart contract (e.g., the smart contract is not executed and no data is transmitted to the vehicle), method 700 proceeds to 714. At 714, method 700 includes performing the commanded action to implement the requested functionality.

At 716, method 700 includes determining whether a request to restrict or disable the functionality has been received, where the request is generated in accordance with the terms of usage defined in the smart contract. A permission to use the functionality of the vehicle may be revoked based on a time having been reached, or based on a new event received at the contract executing VM. For example, the terms of usage may allow the operator to perform the commanded action at a first time, but not allow the operator to perform the commanded action at a second time. Alternatively or additionally, the terms of usage may allow the operator to perform the commanded action based on a first set of event data, but not allow the operator to perform the commanded action based on a second, new set of event data. The request may be generated by the contract executing VM embedded in the blockchain, based on an execution of the smart contract. For example, in a first condition, where the event data received at the contract executing VM does not cause an execution of the smart contract, no request to restrict or disable the functionality may be sent from the contract executing VM to the vehicle ECU. In a second condition, where the event data received at the contract executing VM causes the smart contract to be executed, a request to restrict or disable the functionality may be sent from the contract executing VM to the vehicle ECU. The request may include computer code that, when executed by the vehicle ECU, may terminate or prevent the commanded action.

If at 716 is determined that a request to restrict or disable the functionality has not been received, method 700 proceeds to 718. At 718, method 700 includes continuing operation of the vehicle, and method 700 proceeds back to 716. Alternatively, if at 716 is determined that a request to restrict or disable the functionality has been received, method 700 proceeds to 720. At 720, method 700 includes terminating and/or preventing the commanded action, and notifying the operator that the functionality is no longer permitted in accordance with the terms of usage established in the smart contract. In some embodiments, terminating and/or preventing the commanded action may include executing the computer code generated by the execution of the smart contract.

As an example, a smart contract established, for example, by an owner of a vehicle or by default when a digital key is generated, may specify that a driver's license of an operator of the vehicle must be valid and up-to-date for the operator to operate the vehicle. At a first time, the driver's license of the operator may be valid and up-to-date. When the operator uses the digital key to operate the vehicle, the event of the operator using the digital key to operate the vehicle may be sent by a streaming service running at the vehicle to a contract execution VM stored in a blockchain installed or stored, for example, at the vehicle management system, or at the vehicle. When the contract executing VM receives the event, the contract executing VM may identify the vehicle from data of the event. The contract executing VM may retrieve an NFT-VID corresponding to the vehicle from the blockchain. The contract executing VM may retrieve the smart contract for the operator and an operator ID from the NFT-VID (e.g., from operator smart contracts 216 and operator IDs 214, respectively), and input the event data into the smart contract. The smart contract may determine from the operator ID (e.g., a driver's license) that the driver's license of the operator is valid, and that the terms of usage established in the smart contract allow the operator to operate the vehicle at the first time, whereby the smart contract may not execute. As a result of the smart contract not executing, the operator may be permitted to operate the vehicle at the first time.

At a second, later time, the driver's license of the operator may not be valid and up-to-date (e.g., expired, suspended, etc.). When the operator uses the digital key to operate the vehicle, the event of the operator using the digital key to operate the vehicle may be sent by a streaming service running at the vehicle to the contract execution VM stored in the blockchain. The contract executing VM may identify the vehicle from the event data. The contract executing VM may retrieve the NFT-VID corresponding to the vehicle from the blockchain, and retrieve the smart contract for the operator and the operator ID from the NFT-VID and input the event data and/or the operator ID into the smart contract. The smart contract may determine from the operator ID that the driver's license of the operator is not valid, and that the terms of usage established in the smart contract do not allow the operator to operate the vehicle at the second time, whereby the smart contract may execute. When the smart contract executes, instructions and/or code may be generated, which the contract executing VM may send to the vehicle from a. When the instructions and/or code is transmitted to the vehicle, an ECU of the vehicle may execute the instructions and/or code, which may disable access to the vehicle and/or operation of the vehicle. As a result of the disabled access, the operator may not be permitted to operate the vehicle at the second time.

Thus, methods and systems are disclosed for generating digital keys to a vehicle for use by one or more operators of the vehicle, which may include one or more owners of the vehicle, where the digital keys may establish different terms of usage (including access) for different operators and/or owners. To enforce the different terms of usage, the terms of usage may be written as smart contracts saved on a blockchain, where the smart contracts are automatically executed based on real-time event data transmitted from a streaming service running at the vehicle to a contract executing VM embedded in the blockchain. The smart contracts may be stored in NFTs on the blockchain, where the NFTs may be associated with at least one of the vehicle, an owner of the vehicle, or an operator of the vehicle. A master copy of the blockchain including the NFTs may be stored in a vehicle management system, and copies of the blockchain may be included in the digital keys for installation in the vehicle, where the blockchain receiving the event data may be installed at the vehicle management system or at the vehicle. An application for running the streaming service at the vehicle may also be included in the digital keys.

The digital keys may include identifying information of the vehicle, the one or more owners of the vehicle, and the one or more operators of the vehicle. The digital keys may be created and/or updated via the vehicle management system (e.g., for example, via an Internet browser), or the digital keys may be created and/or updated using an application of the vehicle management system running on an electronic device of an owner of the vehicle. The NFTs used by the digital keys to reference vehicle, owner, and/or operator data and store the smart contracts may also be created and/or updated via the vehicle management system.

The smart contracts may be executed by a contract executing VM embedded in a copy of the blockchain included in the digital key and stored at the vehicle, or by a second contract executing VM of the master copy of the blockchain stored at the vehicle management system. By executing the smart contracts at the vehicle rather than the vehicle management system, a speed with which the contracts are executed may be increased, and a use of processing and memory resources by the vehicle management system may be reduced, increasing a general efficiency of the vehicle management system. Additionally, when the smart contracts are executed at the vehicle, contract execution may not rely on communications to and from the vehicle management system, which may be delayed or unavailable due to network or technical issues. When the smart contracts are executed at or between the vehicle and computing devices of operators, and do not involve communicating with the vehicle management system over a wireless network, a security of the digital key data and permissions established therein may also be increased due to a decreased amount of communication over the network. As a result, contract execution at the vehicle may lead to a more robust and reliable enforcement of the terms of usage.

In general, establishing the terms of usage in smart contracts stored on a blockchain may allow greater flexibility in terms of creating different terms of usage for different vehicles and individuals. An owner may have freedom to create various smart contracts covering a wide variety of different permissions of varying levels of complexity, in a way that is separated from code for managing the vehicle management system or managing operation of the vehicle. In contrast, supporting a wide variety of possible terms of usage that may be applied to a vehicle and/or an operator with operational code of the vehicle management system may be costly, and the wide variety of possible terms of usage may be slow due to limited available developer time. By leveraging the flexibility of smart contracts, an amount of resources consumed by the vehicle management system may be reduced, and an overall efficiency of maintaining the vehicle management system may be increased. New or different terms of usage may be created independently by vehicle owners in an easy-to-use manner via a GUI of the vehicle management system, without writing any computer code. Additionally, because the blockchain operates as a distributed ledger where various copies of the blockchain may exist at different vehicles or owner devices, a validity of the vehicle, owner, and operator data stored in NFTs of the blockchain may be ensured and a security of the smart contracts may be increased. When presented with a possibility that data stored on the blockchain (such as a smart contract) may have been altered by an unauthorized person, copies of the blockchain may be compared to determine whether data of one or more copies of the blockchain are inconsistent with other copies of the blockchain, and therefore invalid.

Further, distributed control over vehicle usage may be advantageous for other reasons. For example, a company may prefer a distributed system, because technological aspects of a vehicle management system and revenue streams may be more effectively separated. For example, the company may wish to sell off the vehicle management system, without affecting the functioning of already-established vehicle controls. Under the distributed system presented herein, a buyer may support legacy customers simply by maintaining the blockchain, and may not have to maintain code for executing a variety of different vehicle control routines, which in the proposed blockchain implementation would be handled by owner-created smart contracts. Additionally, a distributed system may be easier to scale, where the inclusion of more customized and complex terms of usage may be accomplished without affecting a performance of the vehicle management system.

The technical effect of controlling access to, and usage of functionalities of a vehicle by smart contracts on a copy of a blockchain maintained by a vehicle management system, is that a validity of the smart contracts may be ensured, an efficiency of the vehicle management system may be increased, and a flexibility with which different terms of usage may be defined for different operators of a vehicle may be increased.

The disclosure also provides support for a vehicle management system, comprising: a blockchain, a streaming service configured to provide event data in real time to a contract executing virtual machine (VM) embedded in the blockchain, and a non-transitory memory storing instructions that when executed by a processor of the vehicle management system, cause the vehicle management system to: generate a digital key for an operator of a vehicle of the vehicle management system, based on input from an owner of the vehicle, the digital key controlling access to the vehicle and a use of one or more functionalities of the vehicle by the operator, based on one or more smart contracts, store data of the vehicle, the owner, and the operator in the blockchain, the data including the one or more smart contracts, and transmit the digital key wirelessly to a computing device of the operator. In a first example of the system, controlling the access to the vehicle and/or the use of the one or more functionalities of the vehicle via the digital key further comprises: including a computer application for implementing a version of the streaming service, in the digital key, responsive to the application being executed at the vehicle, receiving event data of the vehicle in real time at the vehicle management system via the version of the streaming service, forwarding the event data of the vehicle to the contract executing VM embedded in the blockchain, responsive to the contract executing VM executing at least one smart contract of the one or more smart contracts, receiving instructions controlling the access to the vehicle and/or the use of the one or more functionalities of the vehicle from the contract executing VM, sending the received instructions to the vehicle to be executed by an electronic control unit (ECU) of the vehicle. In a second example of the system, optionally including the first example, controlling the access to the vehicle and/or the use of the one or more functionalities of the vehicle via the digital key further comprises: including a copy of the blockchain in the digital key and instructions to install the copy at the vehicle at a first use of the digital key, including a computer application for implementing a version of the streaming service at the vehicle in the digital key, the version providing real-time event data to a contract executing VM embedded in the copy of the blockchain at the vehicle, the contract executing VM configured to automatically execute the one or more smart contracts stored in the copy of the blockchain based on the real-time event data, which when executed, provides code controlling the access to the vehicle and/or the use of the one or more functionalities of the vehicle to an ECU of the vehicle for execution, and wherein neither of the computing device including the digital key nor the vehicle communicate with the vehicle management system to control the access to the vehicle and/or the use of the one or more functionalities of the vehicle, and no smart contracts are executed by the contract executing VM embedded in the blockchain of the vehicle management system. In a third example of the system, optionally including one or both of the first and second examples, the blockchain is periodically updated at the vehicle by the vehicle management system. In a fourth example of the system, optionally including one or more or each of the first through third examples, storing the data of the vehicle, the owner, and the operator on the blockchain further comprises: writing the data of the vehicle to a non-fungible token (NFT) of the vehicle stored on the blockchain, writing the data of the owner to an NFT of the owner stored on the blockchain, and writing the data of the operator to an NFT of the operator stored on the blockchain. In a fifth example of the system, optionally including one or more or each of the first through fourth examples, the NFT of the vehicle includes at least one of: identifying information of the vehicle, information on assigned digital keys to the vehicle, identification information of one or more owners of the vehicle, identification information of one or more operators of the vehicle. In a sixth example of the system, optionally including one or more or each of the first through fifth examples, the NFT of the owner includes at least one of: identifying information of the owner, information on assigned digital keys to the owner, identification information of one or more vehicles owned by the owner, identification information of one or more vehicles operated by the owner. In a seventh example of the system, optionally including one or more or each of the first through sixth examples, the NFT of the operator includes at least one of: identifying information of the operator, information on assigned digital keys to the operator, identification information of one or more vehicles owned by the operator, identification information of one or more vehicles operated by the operator. In a eighth example of the system, optionally including one or more or each of the first through seventh examples, the one or more smart contracts are stored in at least one of the NFT of the operator, the NFT of the vehicle, and the NFT of the owner. In a ninth example of the system, optionally including one or more or each of the first through eighth examples, the one or more smart contracts are stored in both of the NFT of the operator and the NFT of the vehicle, and the smart contracts are executed at at least one of the computing device of the operator and an ECU of the vehicle, and not executed at the vehicle management system. In a tenth example of the system, optionally including one or more or each of the first through ninth examples, the digital key is created by the owner of the vehicle via a graphical user interface (GUI) of the vehicle management system. In a eleventh example of the system, optionally including one or more or each of the first through tenth examples, the operator is authenticated by the vehicle management system prior to the access being granted via the digital key.

The disclosure also provides support for a method for managing use of a vehicle by a vehicle management system, the method comprising: creating a non-fungible token (NFT) for the vehicle including data of the vehicle at a time of manufacture of the vehicle, and storing the NFT for the vehicle on a blockchain of the vehicle management system, after a purchase of the vehicle, creating an NFT for an owner of the vehicle including data of the owner, and storing the NFT for the owner on the blockchain, creating an NFT for an operator of the vehicle including data of the operator, the operator assigned by the owner of the vehicle, and storing the NFT for the operator on the blockchain, and responsive to data inputted into an application of the vehicle management system by the owner, creating one or more smart contracts controlling at least one of access to the vehicle and a use of a functionality of the vehicle, the one or more smart contracts executable at one or more computing devices including a copy of the blockchain. In a first example of the method, the method further comprises: generating a digital key for the operator, the digital key including the one or more smart contracts, and transmitting the digital key to a computing device of the operator, receiving event data from a streaming service of the vehicle, at a contract executing virtual machine (VM) embedded in a copy of the blockchain installed at the vehicle, the contract executing VM configured to execute the one or more smart contracts based on the event data, and in response to a smart contract of the one or more smart contracts being executed by the contract executing VM, transmit an output of the contract executing VM to an electronic control unit (ECU) of the vehicle for execution. In a second example of the method, optionally including the first example, the method further comprises: including in the digital key an application for implementing the streaming service at the vehicle. In a third example of the method, optionally including one or both of the first and second examples, the method further comprises: installing the copy of the blockchain in the digital key, the copy of the blockchain including a version of the contract executing VM, the version of the contract executing VM configured to receive event data from the streaming service implemented at the vehicle, and execute the one or more smart contracts based on the received event data at a computing device of the operator using the digital key. In a fourth example of the method, optionally including one or more or each of the first through third examples, the method further comprises: updating at least one of the version of the blockchain installed in the digital key and the version of the blockchain installed in the ECU of the vehicle with an updated version of the blockchain received from the vehicle management system.

The disclosure also provides support for a method for controlling at least one of access to a vehicle and a use of a functionality of the vehicle by an operator of the vehicle, the method comprising: receiving, at the vehicle, a digital key transmitted by a computing device of an operator of the vehicle, executing an application stored in the digital key to install a copy of a blockchain of a vehicle management system and a streaming service at the vehicle, the streaming service configured to stream real-time event data of the vehicle to a contract executing virtual machine (VM) embedded in the copy of the blockchain, in response to a smart contract executing at the contract executing VM based on the real-time event data, the smart contract stored on at least one of a non-fungible token (NFT) of the operator and an NFT of the vehicle, receiving instructions from the contract executing VM for controlling the at least one of the access to the vehicle and the use of the functionality of the vehicle by the operator, and executing the instructions at an electronic control unit (ECU) of the vehicle. In a first example of the method, a copy of the blockchain including the contract executing VM is installed at the digital key, and the smart contract is executed at the computing device of the operator storing the digital key. In a second example of the method, optionally including the first example, in a first condition, where the smart contract is executed based on the real-time event data, resulting in at least one of the access to the vehicle and the use of the functionality of the vehicle by the operator being restricted or disabled, and in a second condition, where the smart contract is not executed based on the real-time event data, the at least one of the access to the vehicle and the use of the functionality of the vehicle by the operator is not restricted or disabled.

The disclosure also provides support for a method for tracking at least one non-fungible token (NFT) associated with a physical asset in a distributed ledger on a decentralized peer to peer (P2P) network, the method comprising: storing a record of ownership of the physical asset by a first party in a first entry of the distributed ledger, the first entry including the NFT, storing a record of a lease of the physical asset from the first party to a second party in a second entry of the distributed ledger, the second entry including the NFT, storing a record of a permission to use the physical asset in a third entry of the distributed ledger, the third entry including the NFT, the permission assigned to an operator of the physical asset. In a first example of the method, the physical asset is a vehicle. In a second example of the method, optionally including the first example, the permission is a permission to access the vehicle. In a third example of the method, optionally including one or both of the first and second examples, the permission is a permission to use a functionality of the vehicle. In a fourth example of the method, optionally including one or more or each of the first through third examples, the at least one NFT associated with the physical asset in the distributed ledger includes at least one of: a first NFT of the vehicle, the first NFT including identifying information of the vehicle and one or more smart contracts applicable to the vehicle, a second NFT of an owner of the vehicle, the second NFT including identifying information of the owner and one or more smart contracts applicable to the owner with respect to the vehicle, and a third NFT of an operator of the vehicle, the third NFT including identifying information of the operator and one or more smart contracts applicable to the operator with respect to the vehicle. In a fifth example of the method, optionally including one or more or each of the first through fourth examples, the method further comprises: in response to a condition of a smart contract associated with the vehicle being met, a resulting execution of the smart contract generates instructions, which when transmitted to the vehicle, disable a functionality of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle management system comprising:
    a communication module configured to manage wireless communication between the vehicle management system, a plurality of vehicles, and a plurality of computing devices of operators of the plurality of vehicles;
    a blockchain;
    a streaming service configured to provide event data in real time to a contract executing virtual machine (VM) embedded in the blockchain; and
    a non-transitory memory storing instructions that when executed by a processor of the vehicle management system, cause the vehicle management system to:
        generate a digital key for an operator of a vehicle of the plurality of vehicles, based on input from an owner of the vehicle via a graphical user interface (GUI) of the vehicle management system, the digital key controlling access to the vehicle and a use of one or more functionalities of the vehicle by the operator, based on one or more smart contracts established by the owner, the digital key including identifying information of the operator, identifying information of the owner, an expiration date of the digital key, a copy of the blockchain, and a computer application for implementing a version of the streaming service;
        store data of the vehicle, the owner, and the operator in the blockchain, the data including the one or more smart contracts; and
        transmit the digital key wirelessly to a computing device of the operator, the computing device configured to store the digital key in memory of the computing device.

2. The vehicle management system of claim 1, wherein controlling the access to the vehicle and/or the use of the one or more functionalities of the vehicle via the digital key further comprises:
    responsive to the computer application being executed at the vehicle, receiving event data of the vehicle in real time at the vehicle management system via the version of the streaming service;
    forwarding the event data of the vehicle to the contract executing VM embedded in the blockchain;
    responsive to the contract executing VM executing at least one smart contract of the one or more smart contracts, receiving instructions controlling the access to the vehicle and/or the use of the one or more functionalities of the vehicle from the contract executing VM;
    sending the received instructions to the vehicle to be executed by an electronic control unit (ECU) of the vehicle.

3. The vehicle management system of claim 1, wherein controlling the access to the vehicle and/or the use of the one or more functionalities of the vehicle via the digital key further comprises:
    including in the digital key instructions to install the copy of the blockchain at the vehicle at a first use of the digital key;
    including the computer application for implementing the version of the streaming service at the vehicle in the digital key, the version providing real-time event data to a contract executing VM embedded in the copy of the blockchain at the vehicle, the contract executing VM configured to automatically execute the one or more smart contracts stored in the copy of the blockchain based on the real-time event data, which when executed, provides code controlling the access to the vehicle and/or the use of the one or more functionalities of the vehicle to an ECU of the vehicle for execution; and
    wherein neither of the computing device of the operator including the digital key nor the vehicle communicate with the vehicle management system to control the access to the vehicle and/or the use of the one or more functionalities of the vehicle, and no smart contracts are executed by the contract executing VM embedded in the blockchain of the vehicle management system.

4. The vehicle management system of claim 3, wherein the blockchain is periodically updated at the vehicle by the vehicle management system.

5. The vehicle management system of claim 1, wherein storing the data of the vehicle, the owner, and the operator on the blockchain further comprises:
    writing the data of the vehicle to a non-fungible token (NFT) of the vehicle stored on the blockchain;
    writing the data of the owner to an NFT of the owner stored on the blockchain; and
    writing the data of the operator to an NFT of the operator stored on the blockchain.

6. The vehicle management system of claim 5, wherein the NFT of the vehicle includes at least one of:
    identifying information of the vehicle;
    information on assigned digital keys to the vehicle;
    identification information of one or more owners of the vehicle;
    identification information of one or more operators of the vehicle.

7. The vehicle management system of claim 5, wherein the NFT of the owner includes at least one of:
    identifying information of the owner;
    information on assigned digital keys to the owner;
    identification information of one or more vehicles owned by the owner;
    identification information of one or more vehicles operated by the owner.

8. The vehicle management system of claim 5, wherein the NFT of the operator includes at least one of:
    identifying information of the operator;
    information on assigned digital keys to the operator;
    identification information of one or more vehicles owned by the operator;
    identification information of one or more vehicles operated by the operator.

9. The vehicle management system of claim 5, wherein the one or more smart contracts are stored in at least one of the NFT of the operator, the NFT of the vehicle, and the NFT of the owner.

10. The vehicle management system of claim 5, wherein the one or more smart contracts are stored in both of the NFT of the operator and the NFT of the vehicle, and the one or more smart contracts are executed at at least one of the computing device of the operator and an ECU of the vehicle, and not executed at the vehicle management system.

11. The vehicle management system of claim 1, wherein:
the digital key is created based on a request initiated by the owner via the GUI;
the digital key is editable by the owner via the GUI; and
the digital key is revocable by the owner based on the execution of a smart contract established by the owner via the GUI.

12. The vehicle management system of claim 1, wherein the operator is authenticated by the vehicle management system prior to the access being granted via the digital key.

13. A method for managing use of a vehicle by a vehicle management system in wireless communication with the vehicle, the method comprising:
creating a non-fungible token (NFT) for the vehicle including data of the vehicle at a time of manufacture of the vehicle, and storing the NFT for the vehicle on a blockchain of the vehicle management system;
after a purchase of the vehicle, creating an NFT for an owner of the vehicle including data of the owner, and storing the NFT for the owner on the blockchain;
creating an NFT for an operator of the vehicle including data of the operator, the operator assigned by the owner of the vehicle, and storing the NFT for the operator on the blockchain;
responsive to data inputted into a graphical user interface (GUI) of an application of the vehicle management system by the owner, creating one or more smart contracts controlling at least one of access to the vehicle and a use of a functionality of the vehicle, the one or more smart contracts executable at one or more computing devices including a copy of the blockchain;
generating a digital key for the operator, the digital key including the one or more smart contracts, and transmitting the digital key to a smart phone of the operator, wherein the digital key includes identifying information of the operator, identifying information of the owner, an expiration date of the digital key, and an application for implementing the streaming service at the vehicle;
receiving event data from a streaming service of the vehicle, at a contract executing virtual machine (VM) embedded in a copy of the blockchain installed at the vehicle, the contract executing VM configured to execute the one or more smart contracts based on the event data; and
in response to a smart contract of the one or more smart contracts being executed by the contract executing VM, transmit an output of the contract executing VM to an electronic control unit (ECU) of the vehicle for execution.

14. The method of claim 13, further comprising installing the copy of the blockchain in the digital key, the copy of the blockchain including a version of the contract executing VM, the version of the contract executing VM configured to receive event data from the streaming service implemented at the vehicle, and execute the one or more smart contracts based on the received event data at a computing device of the operator using the digital key.

15. The method of claim 13, further comprising updating at least one of the version of the blockchain installed in the digital key and the version of the blockchain installed in the ECU of the vehicle with an updated version of the blockchain received from the vehicle management system.

16. A method for a remote vehicle management system for controlling at least one of access to a vehicle and a use of a functionality of the vehicle by an operator of the vehicle, the method comprising:
receiving, at the vehicle, a digital key transmitted by a computing device of an operator of the vehicle;
executing an application stored in the digital key to install a copy of a blockchain created on the vehicle management system and a streaming service at the vehicle, the streaming service configured to stream real-time event data of the vehicle to a contract executing virtual machine (VM) embedded in the copy of the blockchain;
in response to a smart contract executing at the contract executing VM based on the real-time event data, the smart contract stored on at least one of a non-fungible token (NFT) of the operator and an NFT of the vehicle, receiving instructions from the contract executing VM for controlling the at least one of the access to the vehicle and the use of the functionality of the vehicle by the operator; and
executing the instructions at an electronic control unit (ECU) of the vehicle.

17. The method of claim 16, wherein a copy of the blockchain including the contract executing VM is installed at the computing device of the operator storing the digital key; and the smart contract is executed at the computing device of the operator storing the digital key.

18. The method of claim 16, wherein:
in a first condition, where the smart contract is executed based on the real-time event data, resulting in at least one of the access to the vehicle and the use of the functionality of the vehicle by the operator being restricted or disabled; and
in a second condition, where the smart contract is not executed based on the real-time event data, the at least one of the access to the vehicle and the use of the functionality of the vehicle by the operator is not restricted or disabled.

* * * * *